US011815932B2

(12) United States Patent
Kim

(10) Patent No.: US 11,815,932 B2
(45) Date of Patent: Nov. 14, 2023

(54) HINGE MODULE AND ELECTRONIC DEVICE INCLUDING THE SAME

(71) Applicant: SAMSUNG ELECTRONICS CO., LTD., Suwon-si (KR)

(72) Inventor: Jaehee Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 225 days.

(21) Appl. No.: 17/449,369

(22) Filed: Sep. 29, 2021

(65) Prior Publication Data

US 2022/0197346 A1 Jun. 23, 2022

Related U.S. Application Data

(63) Continuation of application No. PCT/KR2021/012586, filed on Sep. 15, 2021.

(30) Foreign Application Priority Data

Dec. 18, 2020 (KR) ........................ 10-2020-0178591

(51) Int. Cl.
*G06F 1/16* (2006.01)
(52) U.S. Cl.
CPC .......... *G06F 1/1681* (2013.01); *G06F 1/1618* (2013.01); *G06F 1/1624* (2013.01); *G06F 1/1652* (2013.01)
(58) Field of Classification Search
CPC .... G06F 1/1681; G06F 1/1618; G06F 1/1624; G06F 1/1652; G06F 1/16; G06F 1/1616;
(Continued)

(56) References Cited

U.S. PATENT DOCUMENTS 8,776,319 B1 * 7/2014 Chang ................ G06F 1/1681
16/303
10,604,980 B2 * 3/2020 Yoo ...................... H05K 5/0247
(Continued)

FOREIGN PATENT DOCUMENTS

CN 111613131 9/2020
KR 10-2018-0138494 12/2018
(Continued)

OTHER PUBLICATIONS

International Search Report and Written Opinion dated Dec. 22, 2021 in corresponding International Application No. PCT/KR2021/012586.

*Primary Examiner* — Rockshana D Chowdhury
(74) *Attorney, Agent, or Firm* — Nixon & Vanderhye, P.C.

(57) ABSTRACT

According to various embodiments of the disclosure, an electronic device includes: a first housing and a second housing configured to rotate with respect to each other between a first position at which the first housing and the second housing are disposed to face each other and a second position at which the first housing and the second housing are unfolded from the first position at a specified angle with respect to each other, and a hinge module including a hinge disposed between the first housing and the second housing and configured to couple the first housing and the second housing to be rotatable to each other. The hinge module includes: a first hinge plate coupled with the first housing and disposed to be rotatable around a first rotation axis, a second hinge plate coupled with the second housing and disposed to be rotatable around a second rotation axis parallel to the first rotation axis, a rotation plate disposed to be rotatable around a rotation axis perpendicular to the first rotation axis or the second rotation axis, a first interlocking assembly including at least one of a slider, a link or a (Continued)

connection pin configured to couple the first hinge plate and the rotation plate to each other, and a second interlocking assembly including at least one of a slider, a link or a connection pin configured to couple the second hinge plate and the rotation plate to each other. As the first housing and the second housing rotate, the first hinge plate and the second hinge plate are configured to be interlocked with each other by the rotation plate, the first interlocking assembly, and the second interlocking assembly to rotate between the first position and the second position.

15 Claims, 14 Drawing Sheets

(58) Field of Classification Search
CPC ....... F16C 11/04; H04M 1/02; H04M 1/0216; H04M 1/0268
See application file for complete search history.

(56) References Cited

U.S. PATENT DOCUMENTS

| | | | | |
|---|---|---|---|---|
| 11,231,752 | B2* | 1/2022 | Liu | H04M 1/0216 |
| 11,435,785 | B2* | 9/2022 | Song | G06F 1/1652 |
| 11,493,966 | B2* | 11/2022 | Kim | G06F 1/166 |
| 11,500,428 | B2* | 11/2022 | Huang | G06F 1/1616 |
| 11,644,873 | B2* | 5/2023 | Hsu | G06F 1/1681 361/679.27 |
| 2013/0152342 | A1* | 6/2013 | Ahn | F16C 11/04 16/354 |
| 2014/0220790 | A1* | 8/2014 | Lee | E05D 11/0081 439/31 |
| 2015/0101148 | A1* | 4/2015 | Lee | G06F 1/1681 16/319 |
| 2016/0041589 | A1* | 2/2016 | Tazbaz | H04M 1/022 361/679.06 |
| 2017/0138102 | A1* | 5/2017 | Chuang | G06F 1/1681 |
| 2018/0044958 | A1* | 2/2018 | Tazbaz | G06F 1/1615 |
| 2018/0059737 | A1* | 3/2018 | Wu | G06F 1/1681 |
| 2019/0179373 | A1 | 6/2019 | Cheng et al. | |
| 2019/0194990 | A1 | 6/2019 | Yoo et al. | |
| 2020/0081495 | A1 | 3/2020 | Lin | |
| 2020/0097051 | A1 | 3/2020 | Liu | |
| 2020/0264674 | A1 | 8/2020 | Km et al. | |
| 2020/0267859 | A1 | 8/2020 | Kim et al. | |
| 2020/0383220 | A1 | 12/2020 | Kang et al. | |
| 2021/0064097 | A1 | 3/2021 | Cho | |
| 2021/0318723 | A1 | 10/2021 | Cheng | |
| 2021/0373609 | A1 | 12/2021 | Kim et al. | |
| 2021/0397223 | A1 | 12/2021 | Lee et al. | |
| 2022/0253110 | A1* | 8/2022 | Choi | G06F 1/1681 |
| 2022/0287193 | A1* | 9/2022 | Chun | G09F 9/30 |

FOREIGN PATENT DOCUMENTS

| | | |
|---|---|---|
| KR | 10-2019-0013992 | 2/2019 |
| KR | 10-2019-0046578 | 5/2019 |
| KR | 10-2019-0064939 | 6/2019 |
| KR | 10-2019-0076680 | 7/2019 |
| KR | 10-2019-0078958 | 7/2019 |
| KR | 10-2019-0079033 | 7/2019 |
| KR | 10-2019-0097898 | 8/2019 |
| KR | 10-2020-0073686 | 6/2020 |
| KR | 10-2020-0101238 | 8/2020 |
| KR | 10-2020-0101239 | 8/2020 |
| KR | 10-2152040 | 9/2020 |
| KR | 10-2020-0138948 | 12/2020 |

* cited by examiner

HINGE MODULE AND ELECTRONIC DEVICE INCLUDING THE SAME

CROSS-REFERENCE TO RELATED APPLICATIONS

This application is a continuation of International Application No. PCT/KR2021/012586 designating the United States, filed on Sep. 15, 2021, in the Korean Intellectual Property Receiving Office and claiming priority to Korean Patent Application No. 10-2020-0178591, filed on Dec. 18, 2020, in the Korean Intellectual Property Office, the disclosures of which are incorporated by reference herein in their entireties.

BACKGROUND

Field

The disclosure relates to an electronic device, for example, a hinge module and/or an electronic device including the hinge module.

Description of Related Art

Along with the development of electronics, information, and communication technologies, various functions are being integrated into one electronic device. For example, a smart phone includes the function of an audio player, an imaging device, or an electronic notebook as well as a communication function, and more various functions may be implemented in the smart phone through installation of additional applications.

A user may search, select, and obtain more information by accessing a network, not limited to functions (e.g., applications) or information installed in an electronic device itself. In accessing the network, although a direct access method (e.g., wired communication) may provide fast and stable communication establishment, it may limit a use region to a fixed location or a certain range of space. In accessing the network, a wireless communication method has few restrictions on location or space and offers a transmission speed and stability gradually reaching the same level as the direct access method. In the future, the wireless access method is expected to establish faster and more stable communication than the direct access method.

As personal and portable electronic devices such as smart phones have been widely used, user demands for portability and ease of use are increasing. For example, a touch screen display may provide a screen, for example, a virtual keypad which serves as an output device outputting visual information and substitutes for a physical input device (e.g., keypad). Accordingly, the electronic devices may provide the same or improved usability (e.g., a larger screen), while being miniaturized. It is expected that commercialization of flexible displays, for example, foldable or rollable displays will further improve the portability and ease of use of electronic devices in the future.

Although the portability of an electronic device may be increased by miniaturizing and/or reducing the weight of the electronic device, simple miniaturization may lead to a smaller screen or a limited battery capacity, thereby increasing inconvenience in games or multimedia services. In this context, a foldable or rollable display and/or electronic device which enables reduction of the thickness of the electronic device may ensure user convenience. However, a mechanical structure (e.g., a hinge or a roller) for structurally enabling the display and/or electronic device to be folded or rolled may be another obstacle to miniaturization of the electronic device.

SUMMARY

Embodiments of the disclosure may provide a miniaturized hinge module enabling deformation (folding or unfolding) of a display and/or an electronic device including the hinge module.

Embodiments of the disclosure may provide a hinge module enabling providing of a screen of a sufficient size to improve use convenience and portability and/or an electronic device including the hinge module.

According to various example embodiments of the disclosure, an electronic device may include: a first housing and a second housing configured to rotate with respect to each other between a first position at which the first housing and the second housing are disposed to face each other and a second position at which the first housing and the second housing are unfolded from the first position at a predetermined angle with respect to each other, and a hinge module comprising a hinge disposed between the first housing and the second housing and configured to couple the first housing and the second housing rotatably to each other. The hinge module may include a first hinge plate coupled with the first housing and disposed to be rotabable around a first rotation axis, a second hinge plate coupled with the second housing and disposed to be rotatable around a second rotation axis parallel to the first rotation axis, a rotation plate disposed to be rotatable around a rotation axis perpendicular to the first rotation axis or the second rotation axis, a first interlocking assembly comprising at least one of a slider, link or connection pin configured to couple the first hinge plate and the rotation plate to each other, and a second interlocking assembly comprising at least one of a slider, link or connection pin configured to couple the second hinge plate and the rotation plate to each other. As the first housing and the second housing rotate, the first hinge plate and the second hinge plate may be configured to be interlocked with each other by the rotation plate, the first interlocking assembly, and the second interlocking assembly to rotate between the first position and the second position.

According to various example embodiments of the disclosure, a hinge module and/or an electronic device including the hinge module may include: a first hinge plate disposed to be rotatable around a first rotation axis, a second hinge plate disposed to be rotatable around a second rotation axis parallel to the first rotation axis, a rotation plate disposed to be rotatable around a rotation axis perpendicular to the first rotation axis or the second rotation axis, a first interlocking assembly comprising at least one of a slider, link or connection pin configured to couple the first hinge plate and the rotation plate to each other, and a second interlocking assembly comprising at least one of a slider, link or connection pin configured to couple the second hinge plate and the rotation plate to each other. The first hinge plate and the second hinge plate may be configured to be interlocked with each other by the rotation plate, the first interlocking assembly, and the second interlocking assembly to rotate between a first position at which the first hinge plate and the second hinge plate face each other and a second position at which the first hinge plate and the second hinge plate are unfolded from the first position at a predetermined angle with respect to each other.

According to various example embodiments of the disclosure, a hinge module may enable interworking of folding or unfolding of a plurality of housings by a rotation plate shaped into a flat plate. For example, the rotation plate may be easily installed in a narrow space inside an electronic device, while causing interworking between operations of the housings. Accordingly, the hinge module and/or the electronic device may be miniaturized. For an electronic device of the same size, a larger space for arranging various circuit devices or a battery therein may be secured, and a larger screen may be provided in a portable state, thereby increasing use convenience. Various other effects may be recognized directly or indirectly from this document.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
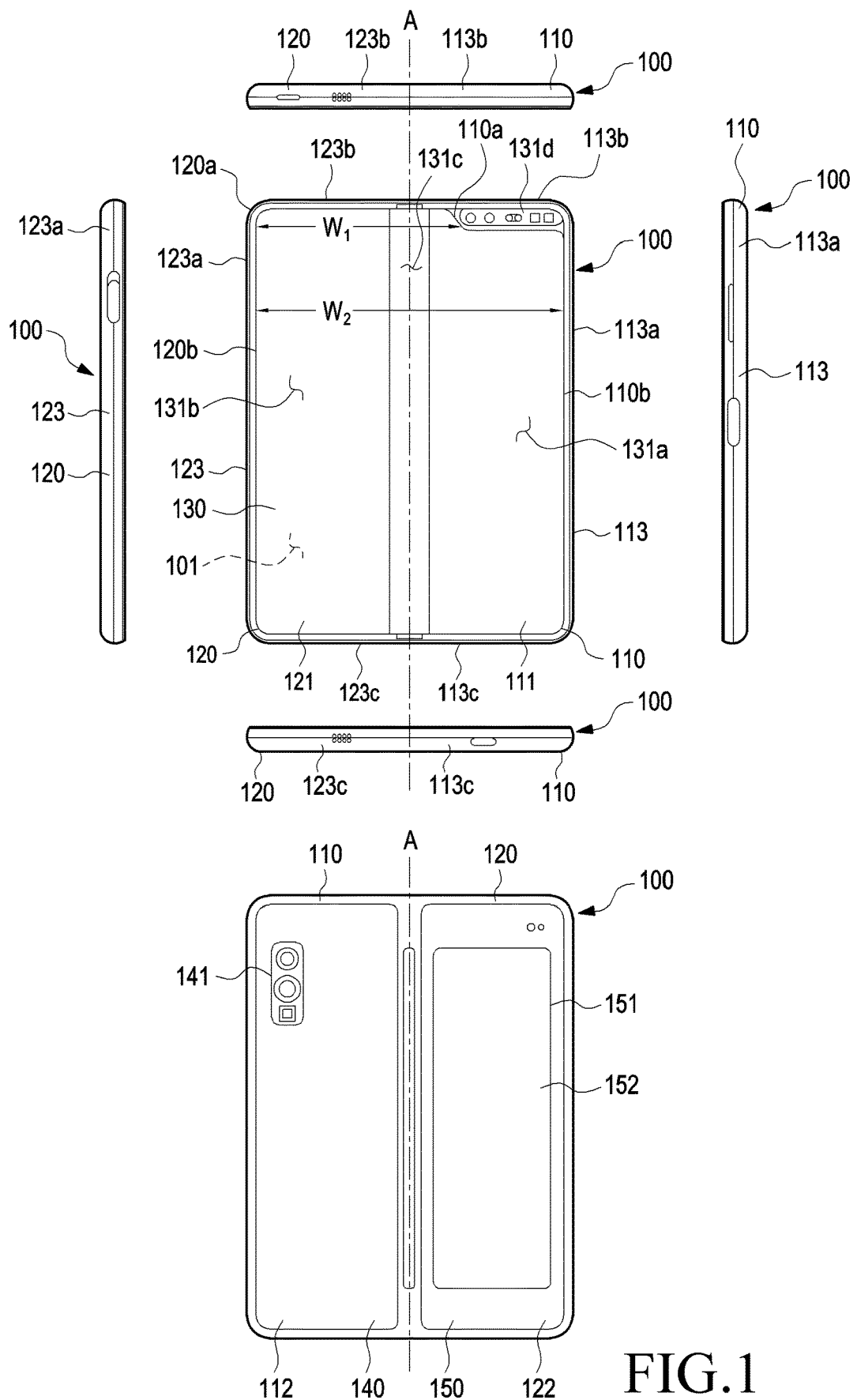
FIG. 1 is a diagram illustrating an electronic device in an unfolded or extended state according to various embodiments.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., a program) including one or more instructions that are stored in a storage medium (an internal memory or an external memory) that is readable by a machine (e.g., an electronic device). For example, a processor (e.g., a processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
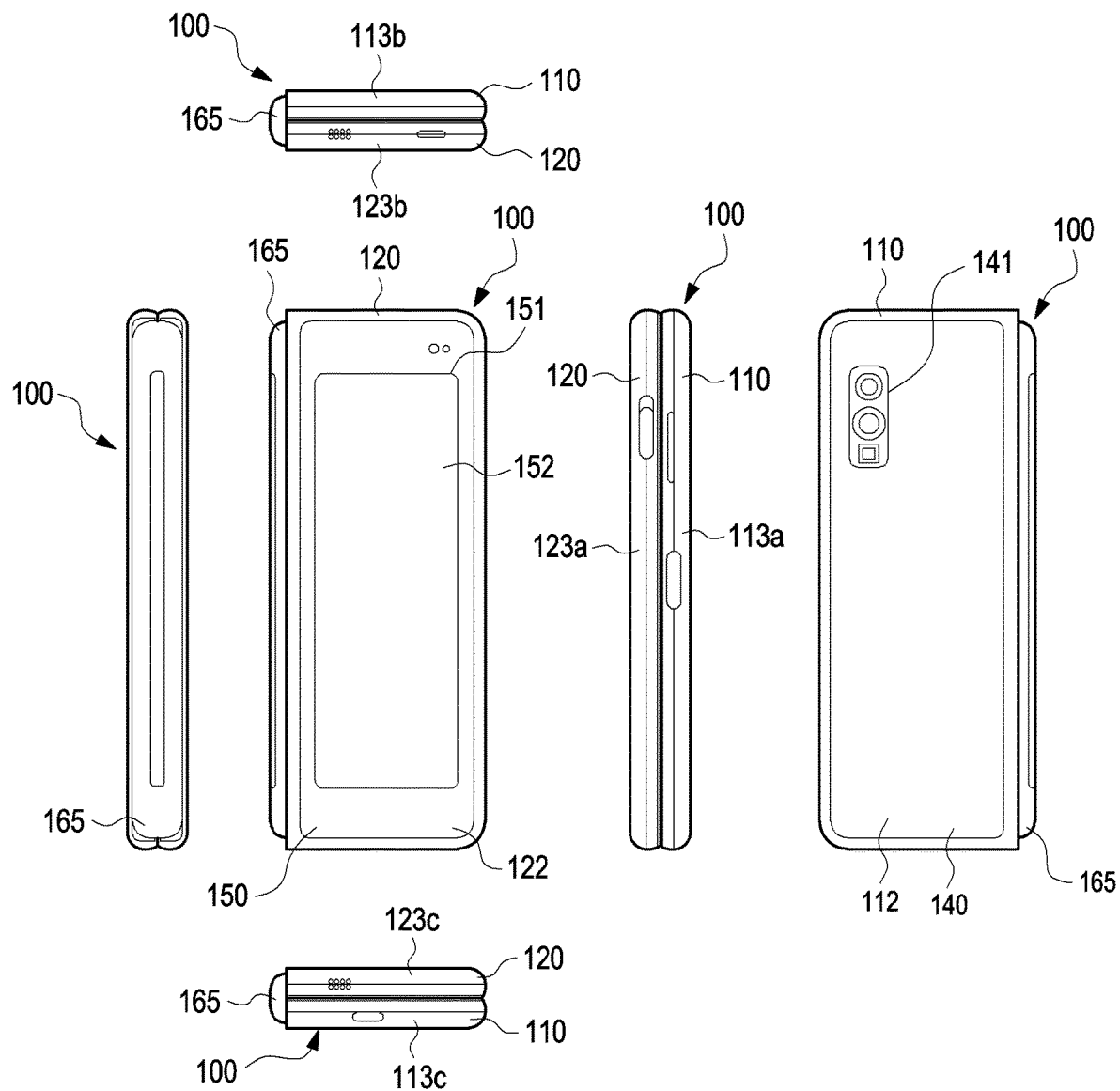
FIG. 2 is a diagram illustrating the electronic device illustrated in FIG. 1 in a folded state according to various embodiments.

FIG. 1 is a diagram illustrating an electronic device 100 in an unfolded or extended state according to various embodiments. FIG. 2 is a diagram illustrating the electronic device 100 illustrated in FIG. 1 in a folded state according to various embodiments.

In the following description, a structure in which a pair of housing structures (or "housings") are rotatably coupled with each other by a hinge structure (or "hinge module") may be illustrated by way of non-limiting example. However, it should be noted that this embodiment does not limit an electronic device according to various embodiments of the disclosure. For example, the electronic device according to various embodiments of the disclosure may include three or more housing structures, and "a pair of housing structures" in an embodiment disclosed below may refer, for example, to "two housing structures rotatably coupled with each other among three or more housing structures."

Referring to FIG. 1, the electronic device 100 may include a pair of housing structures 110 and 120 rotatably coupled with each other by a hinge structure (e.g., a hinge structure 164 in FIG. 3) so that the housing structures 110 and 120 may be folded with respect to each other, a hinge cover 165 covering foldable parts of the pair of housing structures 110 and 120, and a display 130 (e.g., a flexible display or a foldable display) disposed in a space defined by the pair of housing structures 110 and 120. In an embodiment, the electronic device 100 may include a foldable housing in which the pair of housing structures 110 and 120 are rotatably coupled with each other from a folded position at which the housing structures 110 and 120 face each other to a position at which the housing structures 110 and 120 are unfolded in parallel to each other. In this document, a surface on which the display 130 is disposed may be a front surface of the electronic device 100, and an opposite surface of the front surface may be a rear surface of the electronic device 100. Further, a surface surrounding a space between the front and rear surfaces may be a side surface of the electronic device 100.

In an embodiment, the pair of housing structures 110 and 120 may include a first housing structure 110 with a sensor region 131d, a second housing structure 120, a first rear cover 140, and a second rear cover 150. The pair of housing structures 110 and 120 of the electronic device 100 are not limited to the shape and combination illustrated in FIGS. 1 and 2, and may be implemented in other shapes or in a combination and/or coupling of other components. For example, in an embodiment, the first housing structure 110 and the first rear cover 140 may be integrally formed, and the second housing structure 120 and the second rear cover 150 may be integrally formed. In an embodiment, the first housing structure 110 may include the first rear cover 140, and the second housing structure 120 may include the second rear cover 150.

According to an embodiment, the first housing structure 110 and the second housing structure 120 may be disposed on both sides of a first axis, for example, a folding axis A, and may be symmetrical with respect to the folding axis A as a whole. In various embodiments, the first housing structure 110 and the second housing structure 120 may rotate around different folding axes with respect to the hinge structure 164 or the hinge cover 165. For example, the first housing structure 110 and the second housing structure 120 may be rotatably coupled to the hinge structure 164 or the hinge cover 165, respectively, and may rotate around the folding axis A or different folding axes, so that the first housing structure 110 and the second housing structure 120 may rotate between a mutually folded position and a mutually inclined or unfolded position.

In disclosure, "positioned (located) side by side" or "extending side by side" may refer, for example, to a state in which two structures (e.g., the housing structures 110 and 120) are at least partially positioned next to each other or parts thereof located next to each other are arranged in parallel. In various embodiments, "arranged side by side" may refer, for example, to two structures being positioned next to each other, facing in parallel directions or the same direction. While expressions such as "side by side" and "parallel" may be used in the following description, they will be easily understood according to the shape or arrangement relationship of the structures with reference to the accompanying drawings.

According to an embodiment, an angle or a distance between the first housing structure 110 and the second housing structure 120 may vary depending on whether the electronic device 100 is in an extended state (a flat state or open state), a folded state, or an intermediate state. According to an embodiment, while the first housing structure 110 further includes the sensor region 131d having various sensors arranged therein, unlike the second housing structure 120, the first housing structure 110 and the second housing structure 120 may be symmetrical with each other in the remaining region except for the sensor region 131d. In an embodiment, the sensor region 131d may be additionally disposed in or substitute for at least a partial region of the second housing structure 120.

In an embodiment, in the extended (e.g., fully unfolded) state of the electronic device 100, the first housing structure 110 may be coupled to the hinge structure (e.g., the hinge structure 164 in FIG. 3), and include a first surface 111 facing forward from the electronic device 100, a second surface 112 facing in the opposite direction to that of the first surface 111, and a first side member 113 at least partially surrounding a space between the first surface 111 and the second surface 112. In an embodiment, the first side member 113 may include a first side surface 113a disposed in parallel to the folding axis A, a second side surface 113b extending from one end of the first side surface 113a in a direction perpendicular to the folding axis A, and a third side surface 113c extending from the other end of the first side surface 113a in the direction perpendicular to the folding axis A. In the description of various embodiments of the disclosure, expressions such as "parallel" or "perpendicular" are used to describe the arrangement relationship of the above-described side surfaces. However, these expressions encompass the meanings of "partially parallel" or "partially perpendicular" according to embodiments. In various embodiments, the expression "parallel" or "perpendicular" may refer, for example, to including an inclined arrangement relationship within an angle range of 10 degrees.

In an embodiment, the second housing structure 120 may be coupled to the hinge structure (e.g., the hinge structure 164 in FIG. 3) and include a third surface 131 facing forward from the electronic device 100, a fourth surface 122 facing in the opposite direction to that of the third surface 121, and a second side member 123 at least partially surrounding a space between the third surface 121 and the fourth surface 122, in the extended state of the electronic device 101. In an embodiment, the second side member 123 may include a fourth side surface 123a disposed in parallel to the folding axis A, a fifth side surface 123b extending from one end of the fourth side surface 123a in the direction perpendicular to the folding axis A, and a sixth side surface 123c extending from the other end of the fourth side surface 123a in the direction perpendicular to the folding axis A. In an embodiment, the third surface 121 may be disposed to face the first surface 111 in the folded state. In various embodiments, although there are some differences in specific shapes, the second side member 123 may be formed in substantially the same shape as the first side member 113 or may be formed of substantially the same material as the first side member 113.

In an embodiment, the electronic device 100 may include a recess 101 formed to accommodate the display 130 therein through structural shape coupling between the first housing structure 110 and the second housing structure 120. The recess 101 may have substantially the same size as the display 130. In an embodiment, the recess 101 may have two or more different widths in the direction perpendicular to the folding axis A due to the sensor region 131d. For example, the recess 101 may have a first width W1 between a first part 120a of the second housing structure 120 parallel to the folding axis A and a first part 110a of the first housing structure 110, formed at an edge of the sensor region 131d, and a second width W2 between a second part 110b of the second housing structure 120 and a second part 110b of the first housing structure 110, which does not correspond to the sensor region 131d and is parallel to the folding axis A. In this case, the second width W2 may be larger than the first width W1. For example, the recess 101 may be formed to have the first width W1 covering the first part 110a of the first housing structure 110 and the first part 120a of the second housing structure 120 which are asymmetrical to each other, and the second width W2 covering the second part 110b of the first housing structure 110 and the second part 120b of the second housing structure 120 which are symmetrical to each other. In an embodiment, the first part 110a and the second part 110b of the first housing structure 110 may be formed to have different distances from the folding axis A. The widths of the recess 101 are not limited to the illustrated example. In various embodiments, the recess 101 may have two or more different widths according to the shape of the sensor region 131d or asymmetrical parts of the first housing structure 110 and the second housing structure 120.

In an embodiment, the first housing structure 110 and the second housing structure 120 may be at least partially formed of a metal material or a non-metal material having a rigidity selected to support the display 130. In an embodiment, at least parts of the first housing structure 110 and the second housing structure 120 may include an electrically conductive material. When the first housing structure 110 and the second housing structure 120 include an electrically conductive material, the electronic device 100 may transmit and receive radio waves by means of the parts formed of the electrically conductive material in the first housing structure 110 and the second housing structure 120. For example, a processor or communication module of the electronic device 100 may perform wireless communication using the parts of the first housing structure 110 and the second housing structure 120.

In an embodiment, the sensor region 131d may be formed to have a predetermined area adjacent to one corner of the first housing structure 110. However, the arrangement, shape, or size of the sensor region 131d is not limited to the illustrated example. For example, in an embodiment, the sensor region 131d may be provided in any area adjacent to another corner of the first housing structure 110 or in any area between top and bottom corners of the first housing structure 110. In an embodiment, the sensor region 131d may be disposed in at least a partial area of the second housing structure 120. In an embodiment, the sensor region 131d may be disposed to extend to the first housing structure 110 and the second housing structure 120. In an embodiment, the electronic device 100 may include components exposed from the front surface of the electronic device 100 through the sensor region 131d or at least one opening formed in the sensor region 131d, and various functions may be executed by these components. The components arranged in the sensor region 131d may include, for example, at least one of a front camera device, a proximity sensor, an illuminance sensor, an iris recognition sensor, an ultrasonic sensor, or an indicator.

In an embodiment, the first rear cover 140 may be disposed on the second surface 112 of the first housing structure 110 and have a substantially rectangular periphery. In an embodiment, the periphery of the first rear cover 140 may be at least partially surrounded by the first housing structure 110. Similarly, the second rear cover 150 may be disposed on the fourth surface 122 of the second housing structure 120, and the periphery thereof may be at least partially surrounded by the second housing structure 120.

In the illustrated example embodiment, the first rear cover 140 and the second rear cover 150 may be substantially symmetrical with respect to the folding axis A. In an embodiment, the first rear cover 140 and the second rear cover 150 may be in various different shapes. In an embodiment, the first rear cover 140 may be integrally formed with the first housing structure 110, and the second rear cover 150 may be integrally formed with the second housing structure 120.

In an embodiment, a structure in which the first rear cover 140, the second rear cover 150, the first housing structure 110, and the second housing structure 120 are coupled to each other may provide a space in which various components (e.g., a printed circuit board (PCB), an antenna module, a sensor module, or a battery) may be disposed. In an embodiment, one or more components may be disposed or visually exposed on the rear surface of the electronic device 100. For example, one or more components or sensors may be visually exposed through a first rear region 141 of the first rear cover 140. In various embodiments, the sensors may include a proximity sensor, a rear camera device, and/or a flash. In an embodiment, at least a part of a sub-display 152 may be visually exposed through a second rear region 151 of the second rear cover 150.

The display 130 may be disposed in the space defined by the pair of housing structures 110 and 120. For example, the display 130 may be mounted in the recess (e.g., the recess 101 in FIG. 1) formed by the pair of housing structures 110 and 120, and occupy substantially most of the front surface of the electronic device 100. For example, the front surface of the electronic device 100 may include the display 130, and partial areas (e.g., peripheral areas) of the first and second housing structures 110 and 120 adjacent to the display 130. In an embodiment, the rear surface of the electronic device 100 may include the first rear cover 140, a partial area (e.g., a peripheral area) of the first housing structure 110 adjacent to the first rear cover 140, the second rear cover 150, and a partial area (e.g., a peripheral area) of the second housing structure 120 adjacent to the second rear cover 150.

In an embodiment, the display 130 may refer to a display which is at least partially deformable into a flat surface or a curved surface. In an embodiment, the display 130 may include a folding region 131c, a first region 131a on one side of the folding region 131c (e.g., a right region of the folding region 131c), and a second region 131b on the other side of the folding region 131c (e.g., a left region of the folding region 131c). For example, the first region 131a may be on the first surface 111 of the first housing structure 110, and the second region 131b may be on the third surface 121 of the second housing structure 120. For example, the display 130 may extend from the first surface 111 to the third surface 121 through the hinge structure 164 of FIG. 3, and at least an area corresponding to the hinge structure 164 (e.g., the folding region 131c) may be a flexible area deformable from a flat plate to a curved surface.

In an embodiment, the region division of the display 130 is illustrated by way of non-limiting example, and the display 130 may be divided into a plurality of regions (e.g., two regions or four or more regions) according to a structure or a function. For example, in the embodiment illustrated in FIG. 1, the folding region 131c may extend in the direction of a vertical axis (e.g., a Y axis of FIG. 3) parallel to the folding axis A, and the display 130 may be divided into regions by the folding region 131c or the folding axis A, whereas in an embodiment, the display 130 may be divided into regions with respect to a different folding region (e.g., a folding region parallel to a horizontal axis (e.g., an X axis of FIG. 3) or a different folding axis (e.g., a folding axis parallel to the X axis of FIG. 3). The above-described region division of the display 130 is only a physical division by the pair of housing structures 110 and 120 and the hinge structure (e.g., the hinge structure 164 in FIG. 3). The display 130 may display one full screen through substantially the pair of housing structures 110 and 120 and the hinge structure (e.g., the hinge structure 164 in FIG. 3).

According to an embodiment, the first region 131a and the second region 131b may be symmetrical as a whole with respect to the folding region 131c. However, unlike the second region 131b, the first region 131a may include a notch area (e.g., a notch region 133 in FIG. 3) providing the sensor region 131d, and may be symmetrical with the second region 131b in the remaining area. For example, the first region 131a and the second region 131b may include parts symmetrical to each other and parts asymmetrical to each other.

Figure 3:
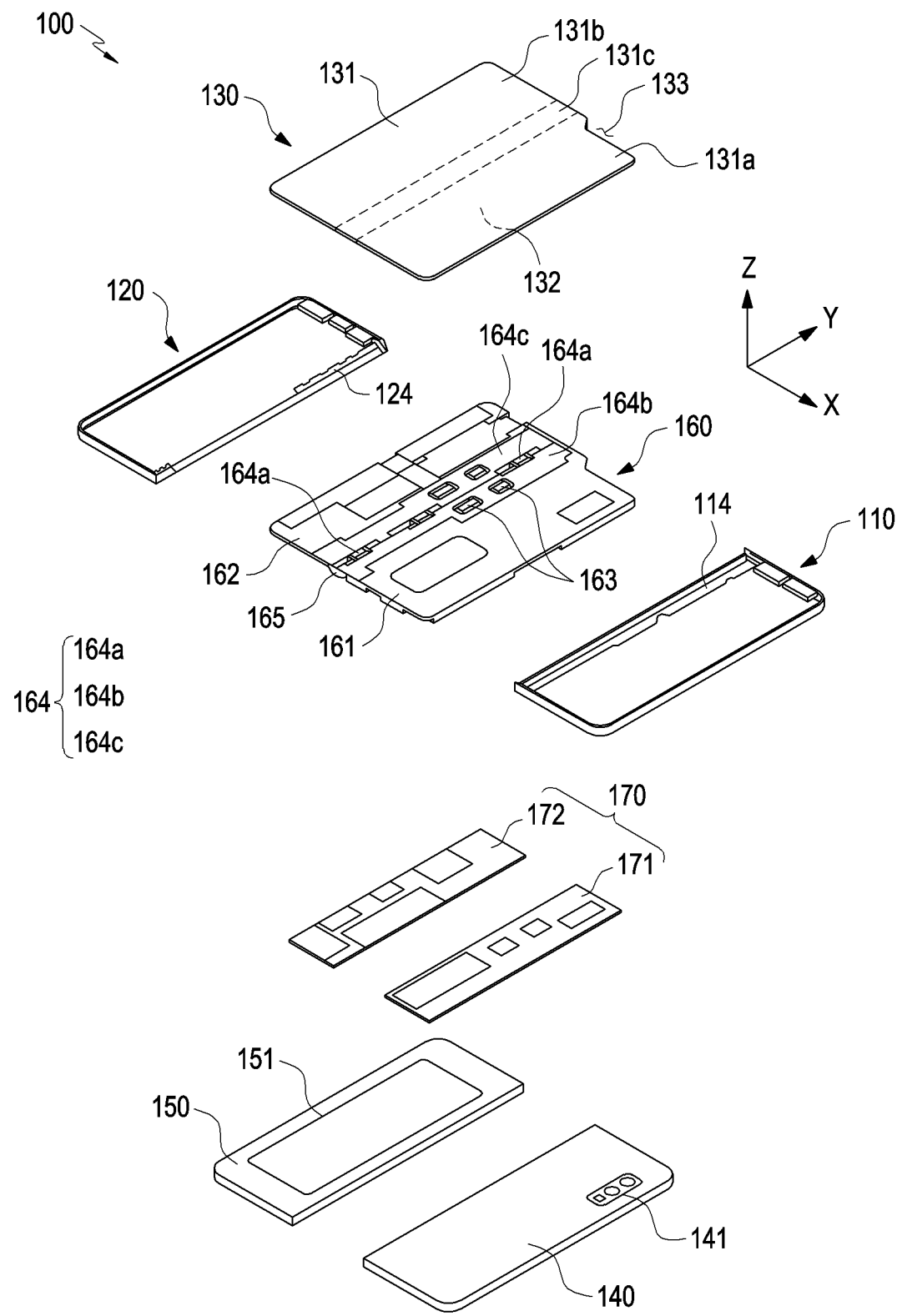
FIG. 3 is an exploded perspective view illustrating an electronic device according to various embodiments.

Referring further to FIG. 3, the hinge cover 165 may be disposed between the first housing structure 110 and the second housing structure 120 and configured to cover internal components (e.g., the hinge structure 164 in FIG. 3). In an embodiment, the hinge cover 165 may be covered or exposed outward by parts of the first housing structure 110 and the second housing structure 120 according to an operating state (the extended state or folded state) of the electronic device 100.

A description will be given of the operation of the first housing structure 110 and the second housing structure 120 and each region of the display 130 according to various operating states (e.g., the extended state and the folded state) of the electronic device 100.

In an embodiment, when the electronic device 100 is in the extended (e.g., fully unfolded) state (e.g., the state of FIG. 1), the first housing structure 110 and the second housing structure 120 are at an angle of 180 degrees, and the first region 131a and the second region 131b of the display 130 may be disposed to face in the same direction, for example, to display screens in parallel directions. Further, the folding region 131c may form the same plane with the first region 131a and the second region 131b.

In an embodiment, when the electronic device 100 is in the folded state (e.g., the state of FIG. 2), the first housing structure 110 and the second housing structure 120 may be disposed to face each other. For example, when the electronic device 100 is in the folded state (e.g., the state of FIG. 2), the first region 131a and the second region 131b of the display 130 may be at a narrow angle (e.g., between 0 and 10 degrees) and face each other. When the electronic device 100 is in the folded state (e.g., the state of FIG. 2), at least a part of the folding region 131c may form a curved surface having a predetermined curvature.

In an embodiment, when the electronic device 100 is in the intermediate state, the first housing structure 110 and the second housing structure 120 may form a certain angle, for example, 90 degrees or 120 degrees. For example, in the intermediate state, the first region 131a and the second region 131b of the display 130 may form an angle larger than that in the folded state and smaller than that in the extended state. At least a part of the folding region 131c may be a curved surface having a predetermined curvature, which is smaller than that in the folded state.

FIG. 3 is an exploded perspective view illustrating the electronic device 100 according to various embodiments.

Referring to FIG. 3, in an embodiment, the electronic device 100 may include the display 130, a support member assembly (e.g., including a support) 160, at least one PCB 170, the first housing structure (e.g., first housing) 110, the second housing structure (e.g., second housing) 120, the first rear cover 140, and the second rear cover 150. In this disclosure, the display 130 may be referred to as a display module or a display assembly.

The display 130 may include a display panel 131 (e.g., a flexible display panel) and at least one plate 132 or layer on which the display panel 131 is mounted. In an embodiment, the plate 132 may be disposed between the display panel 131 and the support member assembly 160. The display panel 131 may be disposed on at least a part of one surface (e.g., a surface in a Z-axis direction of FIG. 3) of the plate 132. The plate 132 may be formed into a shape corresponding to the display panel 131. For example, a partial area of the plate 132 may be formed into a shape corresponding to the notch region 133 of the display panel 131.

The support member assembly 160 may include a first support member 161, a second support member 162, the hinge structure 164 disposed between the first support member 161 and the second support member 162, the hinge cover 165 which covers the hinge structure 164 when the hinge structure 164 is seen from the outside, and a wiring member 163 (e.g., a flexible printed circuit board (FPCB)) crossing the first and second support members 161 and 162.

In an embodiment, the support member assembly 160 may be disposed between the plate 132 and at least one PCB 170. For example, the first support member 161 may be disposed between the first region 131a of the display 130 and a first PCB 171. The second support member 162 may be disposed between the second region 131b of the display 130 and a second PCB 172.

In an embodiment, the wiring member 163 and the hinge structure 164 may be at least partially disposed inside the support member assembly 160. The wiring member 163 may be disposed in a direction (e.g., an X-axis direction) crossing the first support member 161 and the second support member 162. The wiring member 163 may be disposed in the direction (e.g., the X-axis direction) perpendicular to the folding axis (e.g., the Y axis or the folding axis A of FIG. 1) of the folding region 131c.

According to various embodiments, the hinge structure 164 may include a hinge module 164a, a first hinge plate 164b, and/or a second hinge plate 164c. In various embodiments, the hinge module 164a may be interpreted as including the first hinge plate 164b and the second hinge plate 164c. In an embodiment, the first hinge plate 164b may be mounted inside the first housing structure 110, and the second hinge plate 164c may be mounted inside the second housing structure 120. In various embodiments, the first hinge plate 164b may be mounted directly to the first support member 161, and the second hinge plate 164c may be mounted directly to the second support member 162. In an embodiment, the first hinge plate 164b (or the second hinge plate 164c) may be directly mounted to another structure (e.g., a first rotation support surface 114 or a second rotation support surface 124) inside the first housing structure 110 (or the second housing structure 120). For example, the structure in which the first hinge plate 164b (or the second hinge plate 164c) is mounted inside the first housing structure 110 (or the second housing structure 120) may vary depending on an embodiment. In an embodiment, the hinge module 164a may be mounted on the first hinge plate 164b and the second hinge plate 164c to rotatably couple the second hinge plate 164c to the first hinge plate 164b. For example, the folding axis (e.g., the folding axis A in FIG. 1) may be formed by the hinge module 164a, and the first housing structure 110 and the second housing structure 120 (or the first support member 161 and the second support member 162) may rotate substantially on the folding axis A with respect to each other.

The at least one PCB 170 may include the first PCB 171 disposed on the first support member 161 and the second PCB disposed on the second support member 162, as described before. The first PCB 171 and the second PCB 172 may be disposed in a space formed by the support member assembly 160, the first housing structure 110, the second housing structure 120, the first rear cover 140, and the second rear cover 150. Components for executing various functions of the electronic device 100 may be mounted on the first PCB 171 and the second PCB 172.

In an embodiment, with the display 130 coupled with the support member assembly 160, the first housing structure 110 and the second housing structure 120 may be assembled to be coupled to both sides of the support member assembly 160. The first housing structure 110 and the second housing structure 120 may be slidably coupled with both sides of the support member assembly 160, for example, the first support member 161 and the second support member 162, respectively. The first support member 161 and the second support member 162 are accommodated substantially in the first housing structure 110 and the second housing structure 120, and according to an embodiment, the first support member 161 and the second support member 162 may be interpreted as parts of the first housing structure 110 and the second housing structure 120.

In an embodiment, the first housing structure 110 may include the first rotation support surface 114, and the second housing structure 120 may include the second rotation support surface 124 corresponding to the first rotation support surface 114. The first rotation support surface 114 and the second rotation support surface 124 may include curved surfaces corresponding to a curved surface included in the hinge cover 165.

In an embodiment, when the electronic device 100 is in the extended state (e.g., the state of FIG. 1), the first rotation support surface 114 and the second rotation support surface 124 may cover the hinge cover 165 such that the hinge cover 165 may not be exposed or may be minimally exposed from the rear surface of the electronic device 100. In an embodiment, when the electronic device 100 is in the folded state (e.g., the state of FIG. 2), the first rotation support surface 114 and the second rotation support surface 124 may rotate along the curved surface included in the hinge cover 165 to maximize exposure of the hinge cover 165 from the rear surface of the electronic device 100.

In the above description, ordinal numbers such as first and second in the first housing structure 110, the second housing structure 120, the first side member 113, and the second side member 123 are used simply to distinguish components from each other, and it should be noted that the ordinal numbers do not limit the disclosure. For example, although the sensor region 131d has been described as being formed in the first housing structure 110 by way of example, the sensor region 131d may be formed in the second housing structure 120 or the first and second housing structures 110 and 120. In an embodiment, although it has been described that the first rear region 141 is disposed on the first rear cover 140 and the sub-display 152 is disposed on the second rear cover 150 by way of example, both the first rear region 141 for arranging sensors and so on therein and the sub-display 152 for outputting a screen may be disposed on any one of the first rear cover 140 and the second rear cover 150.

Figure 4:
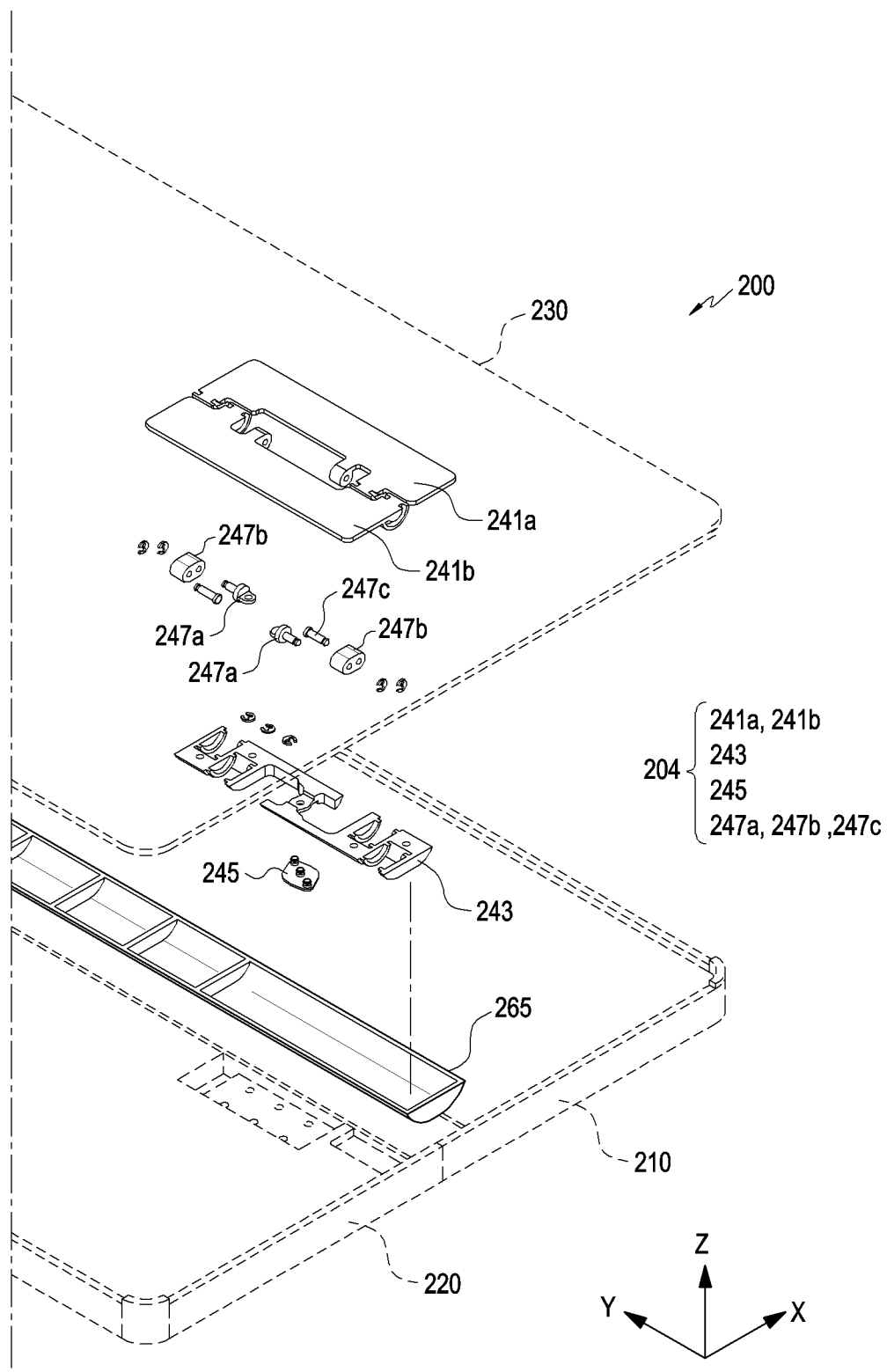
FIG. 4 is an exploded perspective view illustrating an arrangement of a hinge module in an electronic device according to various embodiments.
Figure 5:
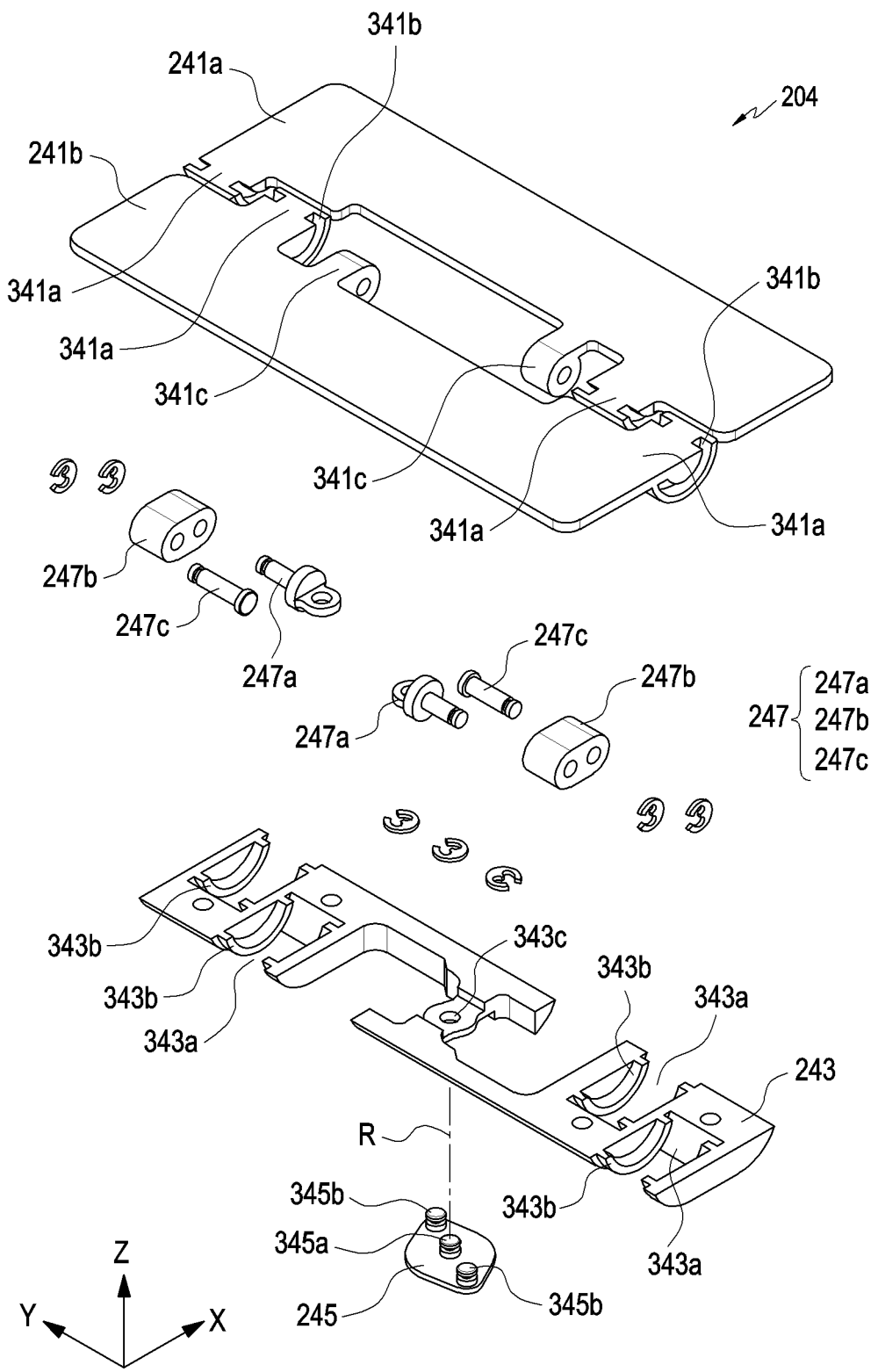
FIG. 5 is an exploded perspective view illustrating a hinge module in an electronic device according to various embodiments.

FIG. 4 is an exploded perspective view illustrating an example arrangement of a hinge module 204 (e.g., the hinge structure 164 and/or the hinge module 164a in FIG. 3) in an electronic device 200 (e.g., the electronic device 100 in FIGS. 1, 2 and 3) according to various embodiments. FIG. 5 is an exploded perspective view illustrating the hinge module 204 in the electronic device 200 according to various embodiments.

Referring to FIGS. 4 and 5, the electronic device 200 may include a first housing 210 (e.g., the first housing structure 110 in FIGS. 1, 2 and 3), a second housing 220 (e.g., the second housing structure 120 in FIGS. 1, 2 and 3), a display 230 (e.g., the display 130 in FIG. 1 and/or FIG. 3), the hinge module 204, and/or a hinge cover 265 (e.g., the hinge cover 165 in FIG. 2 and/or FIG. 3). In the extended state of the electronic device 200, the hinge cover 265 may be substantially concealed by the first housing 210 and the second housing 220, whereas in the folded state of the electronic device 200, the hinge cover 265 may be at least partially exposed to an external space between the first housing 210 and the second housing 220. The hinge module 204 (e.g., the hinge structure 164 and/or the hinge module 164a in FIG. 3) may be disposed or mounted inside (e.g., in an inner surface of) the hinge cover 265 and couple the first housing 201 and the second housing 220 to each other. In an embodiment, the hinge module 204 may provide the folding axis A of FIG. 1. According to an embodiment, the hinge module 204 may provide a rotation axis of the first housing 210 (e.g., a first rotation axis P1 in FIGS. 6, 7 and 8) and a rotation axis of the second housing 220 (e.g., a second rotation axis P2 in FIGS. 6, 7 and 8). The first rotation axis P1 and the second rotation axis P2 may be substantially one rotation axis, similarly to the embodiment of FIG. 1. In an embodiment, the first rotation axis P1 and the second rotation axis P2 may be formed or disposed at positions apart from each other by a certain distance. A direction in which the first rotation axis P1 and/or the second rotation axis P2 extends may be a length direction (e.g., a Y-axis direction) of the electronic device 200.

According to various embodiments, the hinge module 204 and/or the hinge cover 265 may be positioned substantially in correspondence with the folding region of the display 230 (e.g., the folding region 131c in FIG. 1), and the first housing 210 and the second housing 220 may be coupled to the hinge module 204 to rotate with respect to the hinge module 204. The first housing 210 and the second housing 220 may rotate between a position at which the first and second housings 210 and 220 face each other (e.g., the folded state of FIG. 2) and a position at which the first and second housings 210 and 220 are opened at a predetermined angle with respect to each other (e.g., the extended state of FIG. 1). In an embodiment, the term "a position at which the first and second housings 210 and 220 are opened at a predetermined angle with respect to each other" may include a position at which the first housing 210 and the second housing 220 are unfolded at an angle of 180 degrees with respect to each other, and when any one of the first housing 210 and the second housing 220 rotates, the hinge module 204 may rotate the other of the first housing 210 and the second housing 220. For example, when the first housing 210 rotates in a direction away from the second housing 220, the hinge module 204 may rotate the second housing 220 in a direction away from the first housing 210. In various embodiments, when the first housing 210 and the second housing 220 rotate between the position at which the first and second housings 210 and 220 face each other and the position at which the first and second housings 210 and 220 are at an angle of 180 degrees with respect to each other, the first housing 210 may rotate in an angle range of 90 degrees with respect to the hinge module 204, and the second housing 220 may also rotate in the angle range of 90 degrees with respect to the hinge module 204.

According to various embodiments, the hinge module 204 may include a first hinge plate 241a (e.g., the first hinge plate 164b in FIG. 3), a second hinge plate 241b (e.g., the second hinge plate 164c in FIG. 3), a rotation plate 245, and/or interlocking assemblies 247, and the interlocking assemblies 247 may interlock rotation of the first hinge plate 241a and the second hinge plate 241b with rotation of the rotation plate 245. For example, when the first hinge plate 241a rotates, a first interlocking assembly among the interlocking assemblies 247 rotates the rotation plate 245, and along with the rotation of the rotation plate 245, a second interlocking assembly may rotate the second hinge plate 241b. The interlocking assembly between the first hinge plate 241a and the rotation plate 245 and the interlocking assembly between the second hinge plate 241b and the rotation plate 245 may be substantially identical in terms of configuration. In an embodiment, the hinge module 204 may further include a hinge bracket 243, the first hinge plate 241a, the second hinge plate 241b, and the rotation plate 245 may be coupled with the hinge bracket 243, and the interlocking assemblies 247 may couple the hinge plates 241a and 241b to the rotation plate 245 on the hinge bracket 243.

According to various embodiments, each of the hinge plates 241a and 241b may include a hinge arm 341a, a link arm 341c, and/or a rotation guide groove 341b. The first hinge plate 241a and the second hinge plate 241b may have substantially the same structure, and thus the hinge arms 341a, the link arms 341c, and/or the rotation guide grooves 341b provided in the hinge plates 241a and 241b may be described without distinguishing them from each other by attaching 'first' and 'second' to their names. A plurality of hinge arms 341a may be provided in each of the hinge plates 241a and 241b, and at least one link arm 341c may be provided in each of the hinge plates 241a and 241b. In various embodiments, the hinge arms 341a and the link arm(s) 341c may extend from one edge of each of the hinge plates 241a and 241b in a +X direction or a −X direction. The hinge arms 341a of the first hinge plate 241a and the hinge arms 341a of the second hinge plate 241b may be alternately arranged along the Y-axis direction, and the link arm(s) 341c may be disposed between a hinge arm 341a of the first hinge plate 241a and a hinge arm 341a of the second hinge plate 241b.

According to various embodiments, each of the rotation guide grooves 341b may have an arc trajectory, and may be formed on at least one surface of a hinge arm 341a, for example, at least one of the surface of the hinge arm 341a facing in the +Y direction or the surface of the hinge arm 341a facing in the −Y direction. In an embodiment, the arc trajectory of the rotation guide groove 341b may have a specified radius of curvature, and the center of the radius of curvature may be located substantially on the first rotation axis P1 or the second rotation axis P2. For example, the rotation guide groove 341b of the first hinge plate 241a may be one of structures defining the first rotation axis P1, and the rotation guide groove 341b of the second hinge plate 241b may be one of structures defining the second rotation axis P2.

According to various embodiments, the hinge plates 241a and 241b (e.g., the first hinge plate 164b and the second hinge plate 164c in FIG. 3) may be rotatably coupled with the hinge bracket 243, respectively. The hinge bracket 243 may include accommodation holes 343a for accommodating the hinge arms 341a therein, and each of the hinge arms 341a may be at least partially rotatably accommodated in any one of the accommodating holes 343a. In an embodiment, the hinge bracket 243 may include a rotation rail 343b formed on the inner wall of each of the accommodation holes 343a, for example, at least one of the surface of each of the accommodation holes 343a facing in the +Y direction or the surface of the accommodation hole 343a facing in the −Y direction. The rotation rails 343b may protrude from the inner walls of the accommodation holes 343a in the +Y direction or the −Y direction, and extend along the arc trajectories corresponding to the rotation guide grooves 341b. For example, with the rotation rails 343b accommodated in the rotation guide grooves 341b, the hinge arms 341a may be coupled with the accommodation holes 343a to rotate in the accommodation holes 343a. Accordingly, the hinge plates 241a and 241b may be rotatably coupled with the hinge bracket 343 and rotate around the rotation axes P1 and P2 by the guide structures and/or the arc trajectories provided by the rotation guide grooves 341b and/or the rotation rails 343b.

According to various embodiments, the rotation plate 245 may be formed into a substantially flat plate and rotatably coupled with the hinge bracket 243. In an embodiment, with the rotation plate 245 coupled with the hinge bracket 243, the rotation plate 245 may rotate around a rotation axis R (e.g., a rotation axis R in FIG. 8) perpendicular to the first rotation axis P1 and/or the second rotation axis P2. In various embodiments, the rotation axis R may be an axis substantially parallel to a thickness direction (e.g., the Z-axis direction) of the electronic device 200. For example, the rotation plate 245 may be a substantially flat plate and coupled with the hinge bracket 243, with one surface of the rotation plate 245 facing in the Z-axis direction. According to an embodiment, the first hinge plate 241a and the second hinge plate 241b, and/or the first housing 210 and the second housing 220 may be arranged substantially in parallel to the rotation axis R in the folded state, and in parallel to the rotation plate 245 in the extended state.

According to various embodiments, the rotation plate 245 may include a plurality of rotation bosses 345a and 345b. Among the rotation bosses 345a and 345b, a first rotation boss 345a may protrude from one surface of the rotation plate 245 and may be disposed to penetrate through the hinge bracket 243 via a rotation hole 343c. For example, the rotation hole 343c of the hinge bracket 243 and/or the first rotation boss 345a may collectively define the rotation axis R of the rotation plate 245. Although no reference numeral is given, a fastening member such as an E-ring may be fastened to the first rotation boss 345a, so that the rotation plate 245 may rotate while being coupled with the hinge bracket 243. Among the rotation bosses 345a and 345b, second rotation bosses 345b may be provided in a pair and symmetrical to each other, with the first rotation boss 345a therebetween. For example, the second rotation bosses 345b may protrude from one surface of the rotation plate 245, apart from each other by a predetermined distance, and may be disposed in parallel to each other and/or the first rotation boss 345a. In an embodiment, as the rotation plate 245 rotates, the second rotation bosses 345b may orbit around the first rotation boss 345a. As described later, the second rotation bosses 345b may provide a coupling structure with the interlocking assembly(s) 247.

According to various embodiments, the interlocking assemblies 247 include the first interlocking assembly configured to couple the first hinge plate 241a to the rotation plate 245, and the second interlocking assembly configured to couple the second hinge plate 241b to the rotation plate 245. As the first hinge plate 241a rotates, the first interlocking assembly may rotate the rotation plate 245, and as the rotation plate 245 rotates, the second interlocking assembly may rotate the second hinge plate 241b. When the second hinge plate 241b rotates, the first hinge plate 241a may rotate by the interlocking structure of the rotation plate 245 and the interlocking assemblies 247. In various embodiments, the hinge plates 241a and 241b may rotate around any one of the rotation axes P1 and P2 provided by the hinge module 204. In various embodiments, "rotation of the hinge plates 241a and 241b" may refer to relative movement of the hinge plates 241a and 241b with respect to the hinge bracket 243 or the rotation plate 245.

According to various embodiments, each of the interlocking assemblies 247 may include a slider 247a, a link 247b, and/or a connection pin 247c. The slider 247a may be coupled to the rotation plate 245, and the connection pin 247c may be coupled to any one of the hinge plates 241a and 241b through the link 247b. Therefore, rotation of the hinge plates 241a and 241b may be interlocked with rotation of the rotation plate 245. In an embodiment, the slider 247a may be disposed in parallel to the length direction of the electronic device 200, for example, the Y-axis direction, and may have one end rotatably coupled with the rotation plate 245 at a position apart from the rotation axis R. For example, the slider 247a may be coupled to any one of the second rotation bosses 345b, may rotate around a third rotation axis P3 (see FIG. 9) parallel to the rotation axis R, and may be arranged in parallel to the Y axis on the hinge module 204. The connection pin 247c may be coupled to any one of the link arms 341c and disposed in parallel to the slider 247a in the hinge module 204. For example, the connection pin 247c may be disposed in parallel to the Y-axis direction at a position adjacent to the slider 247a. In various embodiments, the link 247b may be coupled to receive a part of the slider 247a as well as a part of the connection pin 247c. For example, the link 247b may be coupled to surround at least a part of the slider 247a and/or the connection pin 247c, and rotate around the slider 247a and/or the connection pin 247c. In various embodiments, the slider 247a may remain aligned in parallel to the Y axis substantially by the link 247b.

According to various embodiments, the slider 247a may move by a specified range in a width direction (e.g., the X-axis direction) of the electronic device 200 according to the rotation of the rotation plate 245, and move in the length direction (e.g., in the Y-axis direction) simultaneously with the movement in the width direction. As the slider 247a is coupled with one of the second rotation bosses 345b at a position apart from the rotation axis R as described before, the position (e.g., the X-axis direction position and/or the Y-axis direction position) of the slider 247b may be changed according to the rotation of the rotation plate 245. Despite the position change, the slider 247a may be maintained parallel to the Y axis by the link 247b. In an embodiment, as the hinge plate(s) 241a or 241b rotates, the connection pin 247c may move in the X-axis direction and the Z-axis direction, while being maintained parallel to the Y-axis direction. For example, as the hinge plate(s) 241a or 241b rotates, the connection pin 247c may rotate around any one of the first rotation axis P1 and the second rotation axis P2. Depending on the displacement of the connection pin 247c (e.g., displacement in the X-axis direction and/or the Z-axis direction), the link 247b may rotate around the connection pin 247c and/or the slider 247a.

Although not specified in the above embodiment, the hinge module 204 and/or the electronic device 200 including the same may include a plurality of fastening members, and the plurality of fastening members may fasten the sliders 247a with the rotation plate 245, the links 247b with the sliders 247a and/or the connection pins 247c with the links 247b without slip-off. The fastening member(s) may include, for example, a C-ring or an E-ring.

Figure 6:
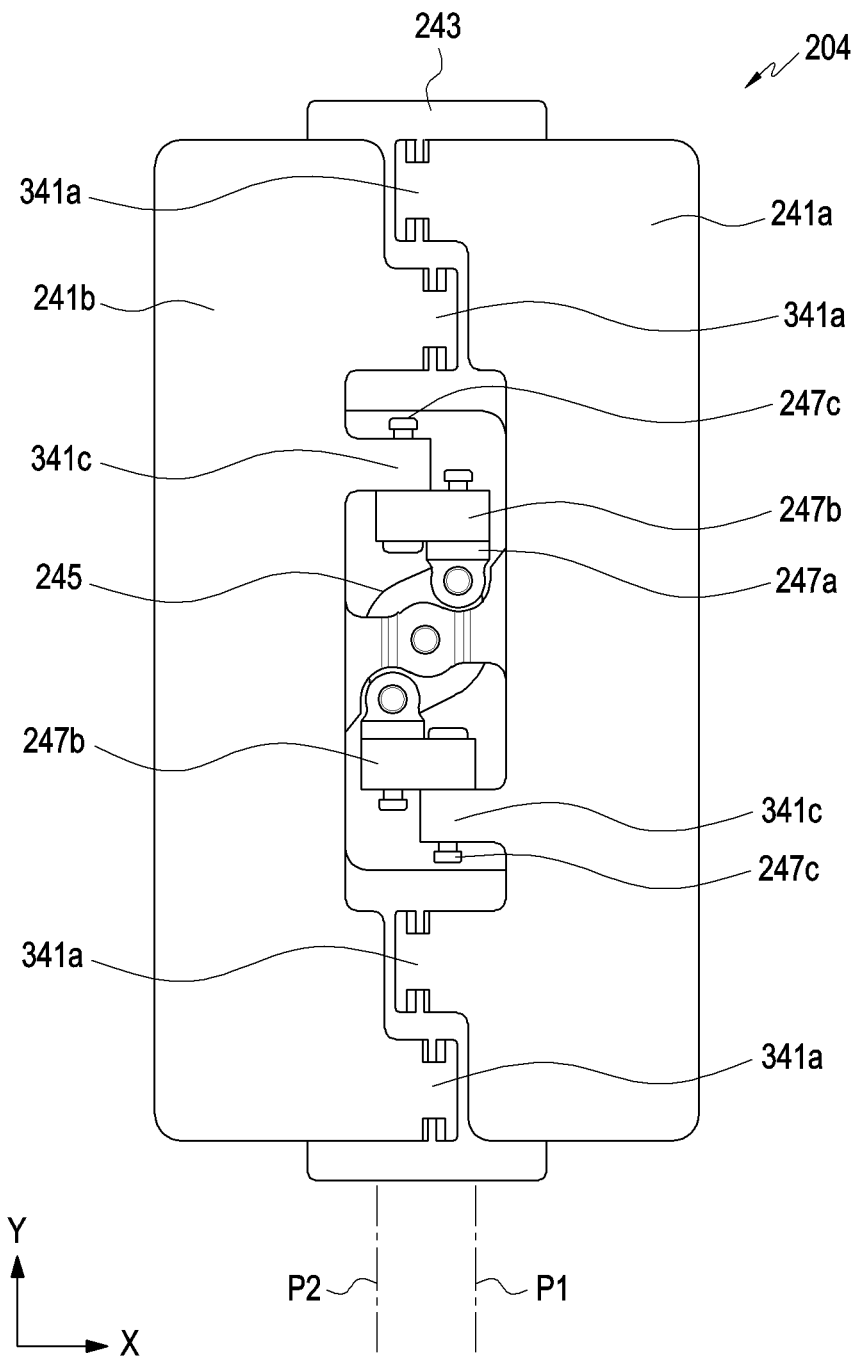
FIG. 6 is a plan view illustrating a hinge module in an electronic device according to various embodiments.
Figure 7:
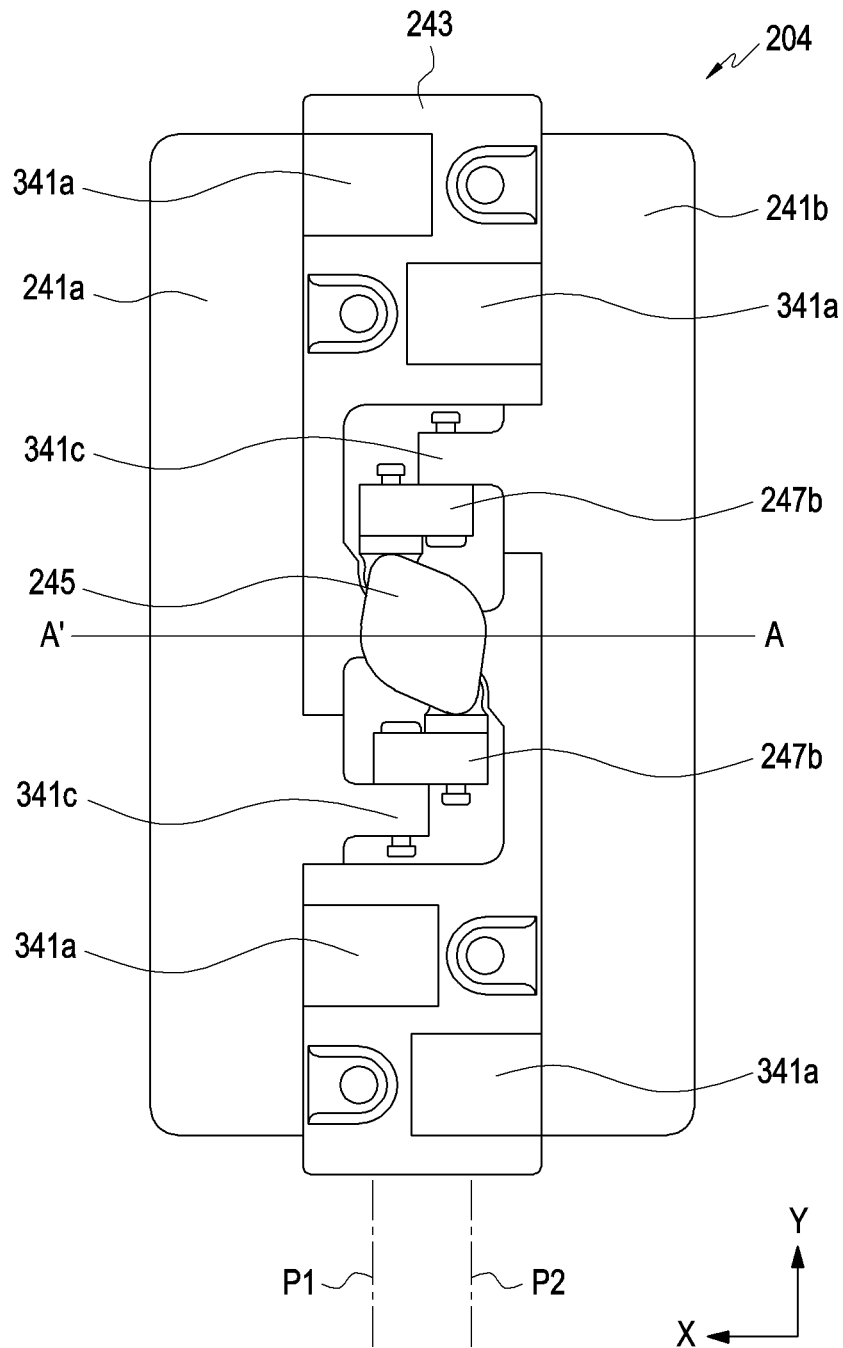
FIG. 7 is a bottom view illustrating a hinge module in an electronic device according to various embodiments.
Figure 8:
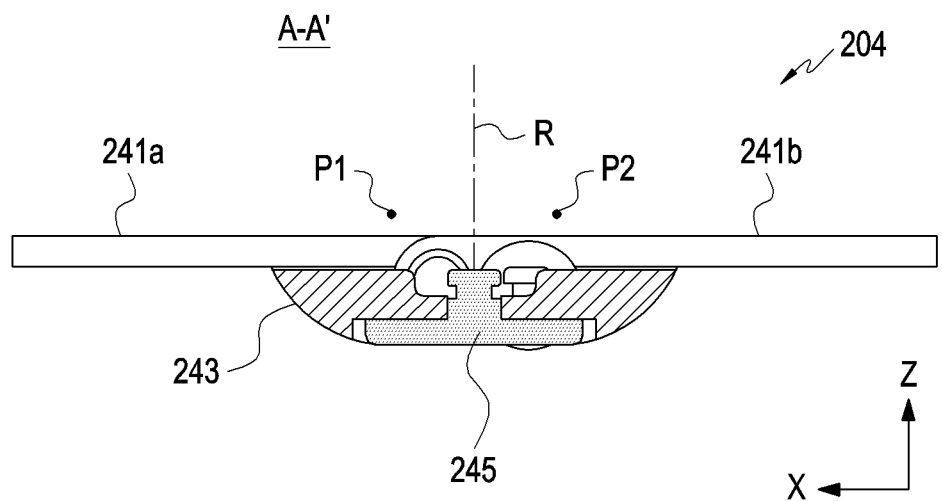
FIG. 8 is a sectional view illustrating the hinge module illustrated in FIG. 7, taken along line A-A' according to various embodiments.
Figure 9:
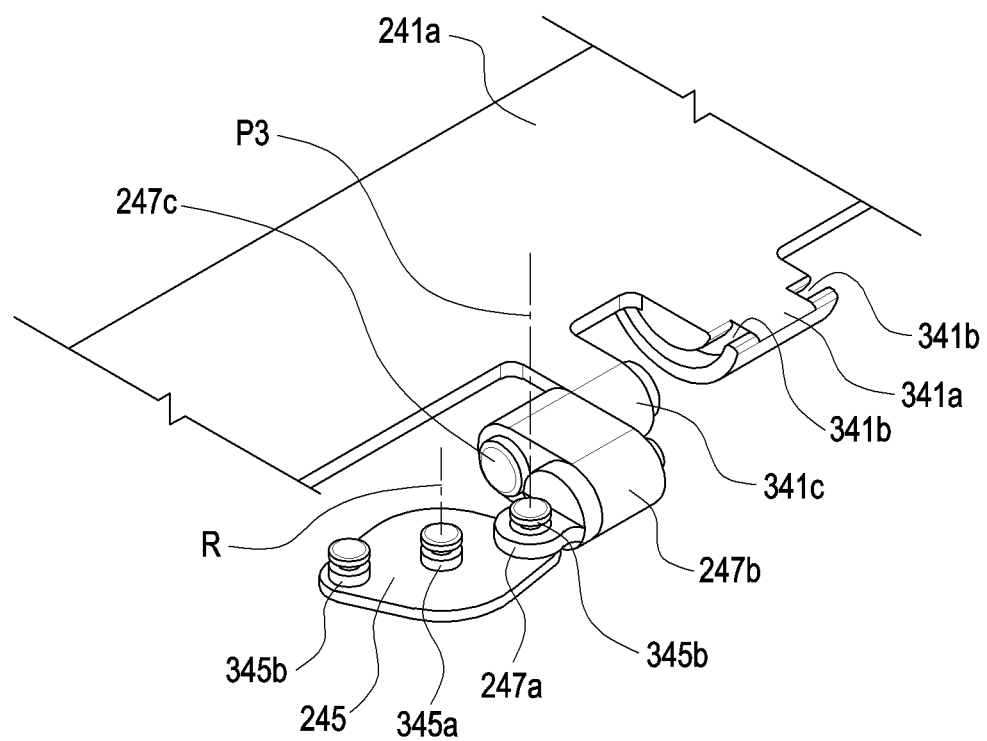
FIG. 9 is a perspective view illustrating a coupling structure between a rotation plate and hinge plate(s) in a hinge module in an electronic device according to various embodiments.

FIG. 6 is a plan view illustrating a hinge module (e.g., the hinge structure 164 and the hinge module 164a in FIG. 3 and/or the hinge module 204 in FIGS. 4 and 6) of an electronic device (e.g., the electronic devices 100 and 200 in FIGS. 1, 2, 3, and 4) according to various embodiments. FIG. 7 is a bottom view illustrating the hinge module 204 in the electronic device 200 according to various embodiments. FIG. 8 is a sectional view illustrating the hinge module 204, taken along line A-A' of FIG. 7 according to various embodiments. FIG. 9 is a perspective view illustrating a coupling structure between the rotation plate 245 and the hinge plate(s) 241a or 241b in the hinge module 204 of the electronic device 200 according to various embodiments.

Referring to FIGS. 6, 7, 8 and 9 (which may be referred to hereinafter as FIGS. 6 to 9), the hinge plates 241a and 241b may be coupled with the hinge bracket 243 to rotate around the first rotation axis P1 or the second rotation axis P2, and the rotation plate 245 may be coupled with the hinge bracket 243 to rotate around the rotation axis R. In an embodiment, the first rotation axis P1 or the second rotation axis P2 may be at the center of the radius of curvature of the rotation guide grooves 341b and/or rotation rails (e.g., the rotation rails 343b in FIG. 5). The center of the radius of curvature of the rotation guide grooves 341b may be located in a space outside the structure (e.g., the hinge plate(s) 241a or 241b) forming the hinge module 204. In various embodiments, the rotation axis R of the rotation plate 245 may be formed by, for example, rotatably configured to couple the first rotation boss 345a with a rotation hole (e.g., the rotation hole 343c in FIG. 5).

According to various embodiments, when the first hinge plate 241a rotates in the state illustrated in FIG. 6, for example, in the extended state illustrated in FIG. 1, the connection pins 247c coupled to the first hinge plate 241a (e.g., the link arms 341c) may move the links 247b and the sliders 247a in the +X direction, while moving in the +X direction. When the first hinge plate 241a rotates, the links 247b may move in the +X direction while rotating with respect to the connection pins 247c and/or the sliders 247a. While moving in the +X direction, the sliders 247a may be maintained aligned in the Y-axis direction by the links 247b. As the sliders 247a move in the +X direction while being maintained aligned in the Y-axis direction, the rotation plate 245 may rotate counterclockwise.

According to various embodiments, as the rotation plate 245 rotates, the link arm 341c of the second hinge plate 241a may move the second hinge plate 241b around the second rotation axis P2 by the interlocking assemblies 247, while moving in the -X direction and/or orbiting around the second rotation axis P2. Accordingly, the hinge plates 241a and 241b may rotate or move from a position at which the hinge plates 241a and 241b are unfolded side by side, each on one side of the other to a position at which the hinge plates 241a and 241b face each other (e.g., the folded state of FIG. 2). In an embodiment, the operation of unfolding the hinge plates 241a and 241b may be performed in a reverse order of the operation of rotating the hinge plates 241a and 241b to the position at which the hinge plates 241a and 241b face each other. While the rotation operation to the folded state and/or the extended state is described in the context of the configuration in which the second hinge plate 241b is interlocked with the rotation of the first hinge plate 241a, the folding operation and/or the unfolding operation may be performed by interlocking the rotation of any one of the hinge plates 241a and 241b with the other hinge plate.

Figure 10:
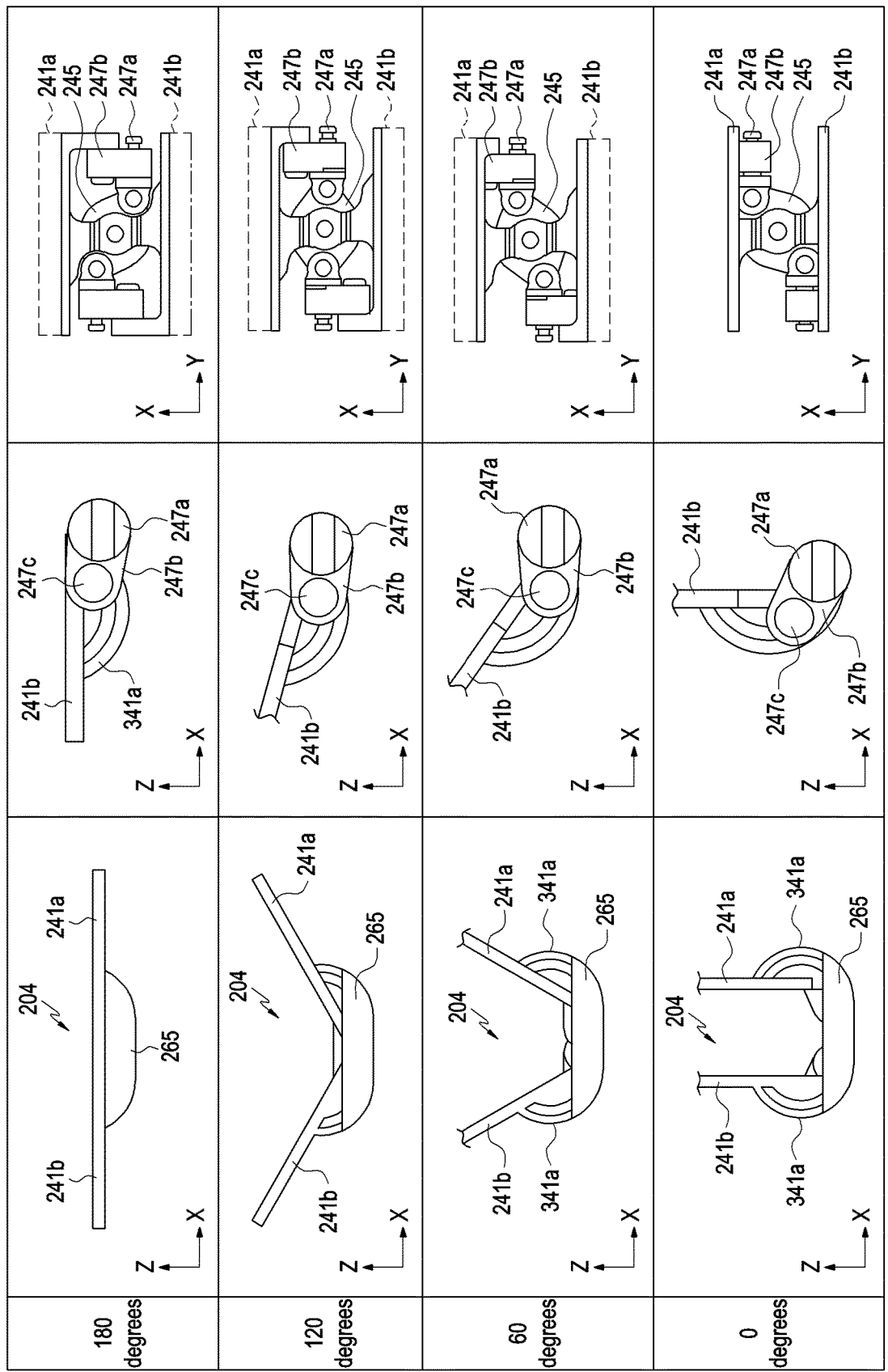
FIG. 10 is a diagram illustrating an example operation of a hinge module in an electronic device according to various embodiments.

FIG. 10 is a diagram illustrating various example operations of a hinge module (e.g., the hinge module 204 in FIGS. 4 and 5) of an electronic device (e.g., the electronic devices 100 and 200 in FIGS. 1, 2, 3, and 4) according to various embodiments.

Referring to FIG. 10, the hinge module 204 in the extended state (e.g., the state shown in FIG. 1) of the electronic device 200 is shown in a row labeled with "180 degrees", and the hinge module 204 in the folded state of the electronic device 200 (e.g., the state in FIG. 2) is shown in a row labeled with "0 degrees". In a row labeled with "120 degrees" and/or "60 degrees", the hinge module 204 is shown in the state where the first housing 210 and the second housing 220 (e.g., the first housing structure 110 and the second housing structure 120 in FIG. 1 and/or FIG. 2) are unfolded inclinedly at an angle of 120 degrees and/or 60 degrees with respect to each other. In FIG. 10, the second column showing the hinge module 204 illustrates relative positions of the hinge plates 241a and 241b in the folding and/or unfolding operation, the third column illustrates changes in the relative position of the slider 247a, the link 247b, and/or the connection pin 247c, and the fourth column illustrates X-axis direction and/or Y-axis direction displacements of the slider 247a according to the rotation of the rotation plate 245.

According to various embodiments, depending on the rotation positions of the hinge plates 241a and 241b, the connection pins 247c and the links 247b may move in the X-axis direction and/or the Z-axis direction, and the sliders 247a may move in the X-axis direction and/or the Y-axis direction. In an embodiment, an X-axis direction movement and/or Z-axis direction movement of the connection pins 247c may be made by the rotation of the hinge plate(s) 241a or 241b, for example, the X-axis direction movement of the connection pins 247c may be interlocked with the rotation of the rotation plate 245. In various embodiments, the X-axis direction displacements of the connection pins 247c may be different from the X-axis direction displacements of the sliders 247a, and the sliders 247a may not generate Z-axis direction movements, whereas the connection pins 247c may move in the Z-axis direction with respect to the sliders 247a. The links 247b are rotatably coupled with the connection pins 247c and the sliders 247a, thereby compensating for or allowing for a relative displacement difference between the connection pins 247c and the sliders 247a and moving the connection pins 247c and the sliders 237a together in the X-axis direction.

According to various embodiments, the sliders 247a may be slidably coupled with the links 247b. For example, when the rotation plate 245 rotates, the sliders 247a may linearly reciprocate with respect to the links 247b along the length direction (e.g., the Y-axis direction), while being maintained parallel to the Y axis. According to an embodiment, when the rotation axis R is used as a reference, the distance between the rotation axis R and each slider 247a as measured along the Y-axis direction, and/or the Y-axis direction coordinate of the slider 247a as measured with respect to the rotation axis R may vary according to the rotation of the rotation plate 245. In various embodiments, the links 247b may be positioned at a fixed distance in the Y-axis direction substantially from the rotation axis R, and the sliders 247a may be coupled with the links 247b, to be slidable along the Y-axis direction. In an embodiment, the links 247b and the sliders 247a may be fixed to each other in the Y-axis direction, and the links 247b and the connection pins 247c may be coupled with each other, to be movable in the Y-axis direction. For example, relative displacements in the Y-axis direction generated within the interlocking assemblies 247 in the unfolding operation or the folding operation may be compensated for by the coupling structure (e.g., slide coupling) between the links 247b and the sliders 247a and/or the coupling structure between the links 247b and the connection pins 247c.

A position relationship according to this relative movement will be described in greater detail below with further reference to FIGS. 11, 12, 13, and 14.

Figure 11:
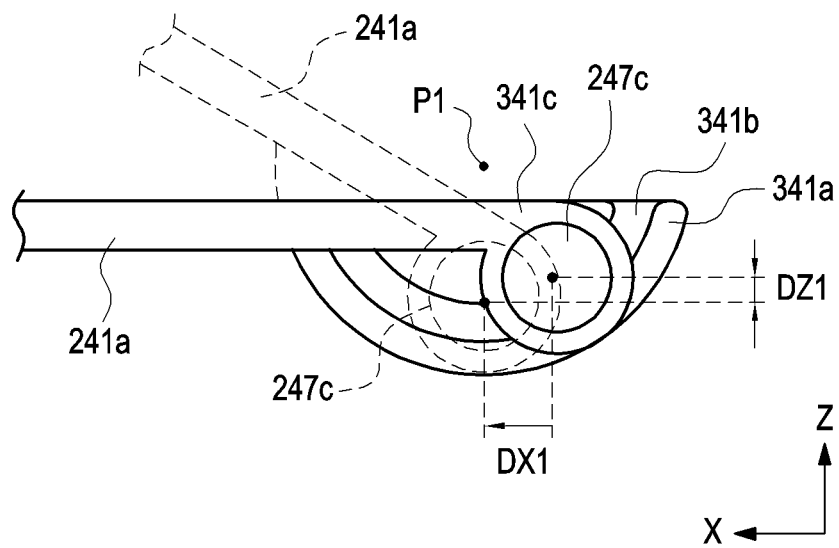
FIG. 11 is a side view illustrating an operation of hinge plate(s) of a hinge module in an electronic device according to various embodiments.
Figure 12:
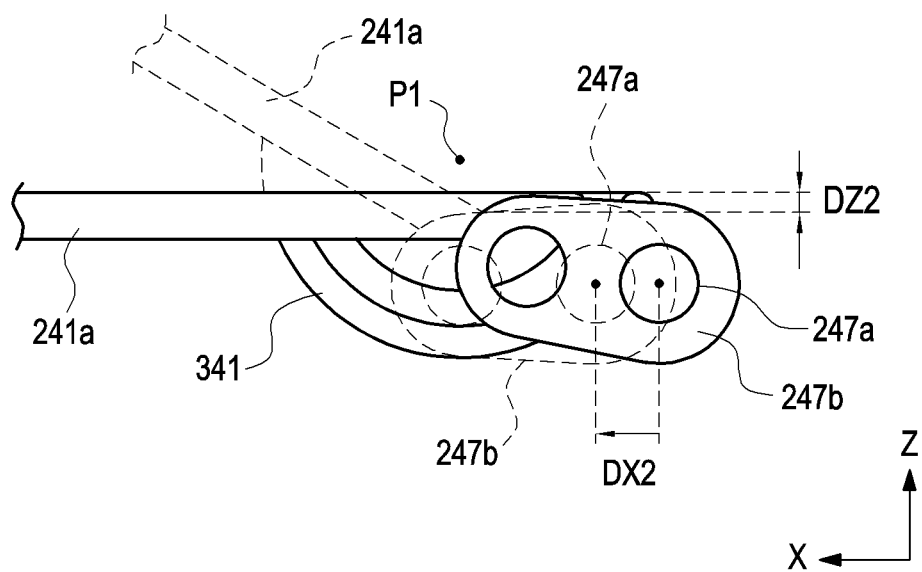
FIG. 12 is a side view illustrating an operation of interworking assembly(s) in a hinge module of an electronic device according to various embodiments.

FIG. 11 is a side view illustrating a hinge module (e.g., the hinge module 204 in FIGS. 4 and 5) of an electronic device (e.g., the electronic devices 100 and 200 in FIGS. 1, 2, 3, and 4) according to various embodiments. FIG. 12 is a side view illustrating an operation of interlocking assembly(s) (e.g., the interlocking assemblies 247 in FIG. 5) in the hinge module 204 of the electronic device 200 according to various embodiments.

Referring to FIGS. 11 and 12, as the slider 247a and the connection pin 237c are coupled with each other by the link 247b, the distance between the slider 247a and the connection pin 247c may be kept constant, and a distance measured along the X-axis direction and/or a distance measured along the Z-axis direction may vary. In an embodiment, the connection pin 247c may move in the X-axis direction and/or the Z-axis direction by rotation of the rotation plate 245 and/or rotation of the hinge plates 241a and 241b. Those skilled in the art will readily understand that this is because the connection pin 247c is disposed at a position apart from any one (e.g., the first rotation axis P1) of the rotation axes P1 and P2 of the hinge plates 241a and 241b. Because the hinge bracket 243 or the rotation plate 245 is disposed at a fixed position substantially with respect to the first rotation axis P1, the connection pin 247c may move in the X-axis direction and/or the Z-axis direction with respect to the hinge bracket 243 or the rotation plate 245. In FIG. 11, the movement (or displacement) of the connection pin 247c in the X-axis direction and/or the Z-axis direction is indicated by "DX1" and "DZ1". In an embodiment, the slider 247a may be fixed substantially to the rotation plate 245 in the Z-axis direction and move in the X-axis direction and/or the Y-axis direction along with the rotation of the rotation plate 245. In FIG. 12, the displacement of the slider 247a in the X-axis direction is indicated by "DX2", and the displacement DX1 and the displacement DX2 caused by the rotation of the hinge plates 241a and 241b (and/or the rotation of the rotation plate 245) may be different. In an embodiment, the link 247b may compensate for or allow for the difference between the displacement DX1 and the displacement DX2 by rotating with respect to the connection pin 247c and/or the slider 247a, while generating a displacement DZ2. Accordingly, the link 247b may couple the connection pin 247c and the slider 247a to each other so that the connection pin 247c and the slider 247a move together in the X-axis direction, and the difference in relative displacements generated in the X-axis direction (e.g., the difference between the displacement DX1 and the displacement DX2) may be compensated for by the rotation of the link 247b.

Figure 13:
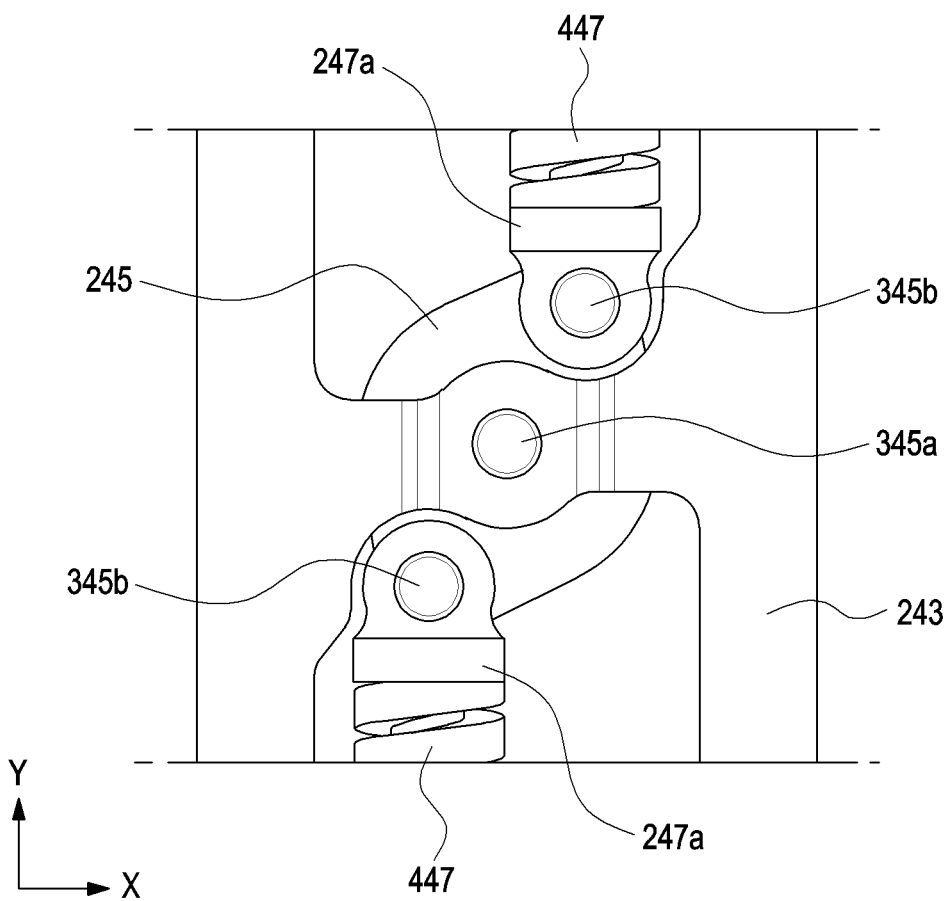
FIG. 13 is a diagram illustrating an example of a hinge module in an electronic device according to various embodiments.
Figure 14:
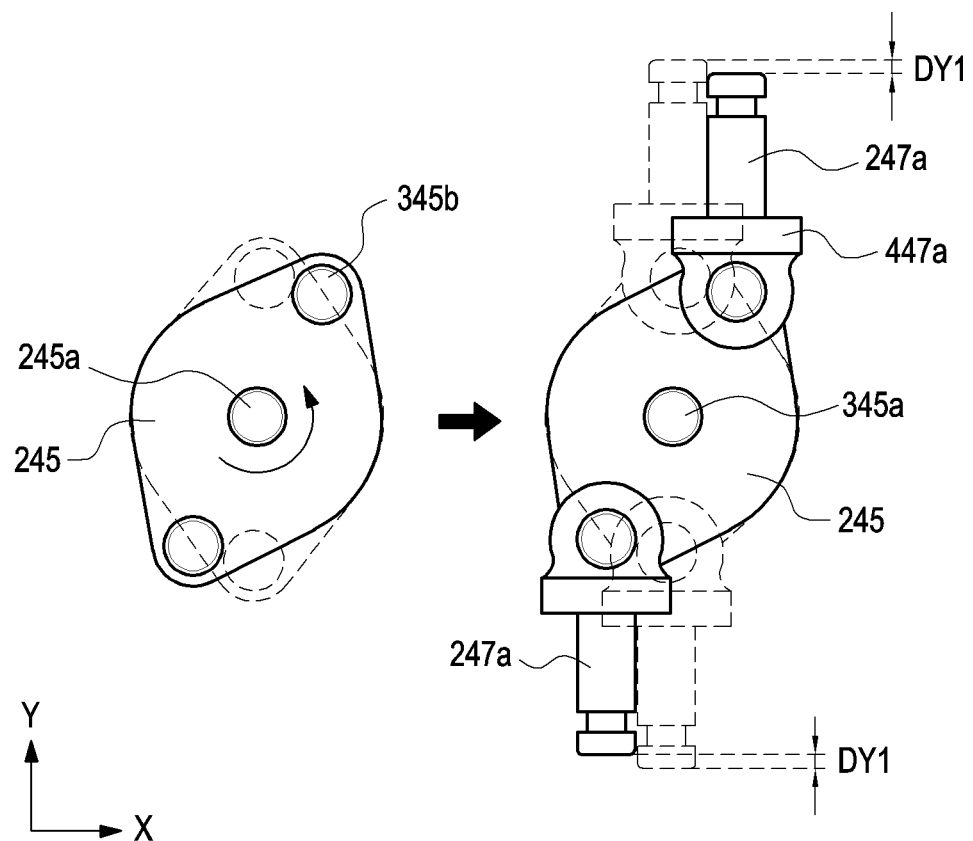
FIG. 14 is a diagram illustrating an example operation of a slider in a hinge module of an electronic device according to various embodiments.
Figure 15:
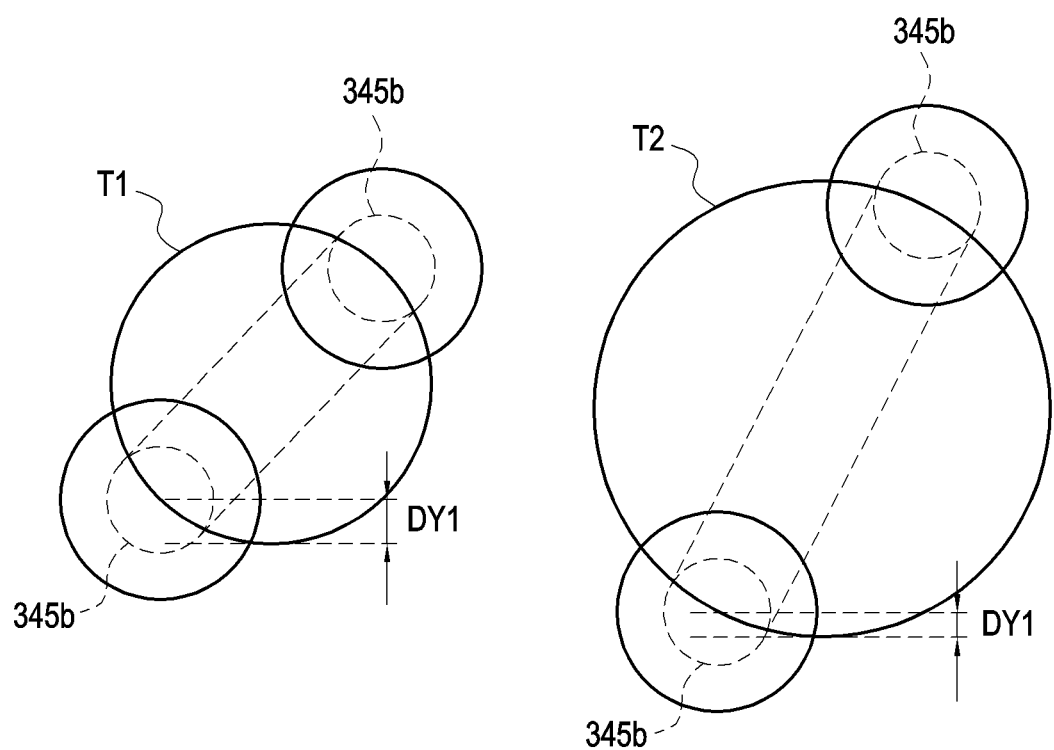
FIG. 15 is a diagram illustrating example displacement of a slider in a hinge module of an electronic device according to various embodiments.

FIG. 13 is a diagram illustrating an example of a hinge module (e.g., the hinge module 204 in FIGS. 4 and 5) of an electronic device (e.g., the electronic devices 100 and 200 in FIGS. 1, 2, 3, and 4) according to various embodiments. FIG. 14 is a diagram illustrating an example operation of a slider 247a in the hinge module 204 of the electronic device 200 according to various embodiments. FIG. 15 is a diagram illustrating the displacement of the slider 247a in the hinge module 204 of the electronic device 200 according to various embodiments.

Referring to FIGS. 13, 14 and 15, the slider 247a may move along the Y-axis direction in the hinge module 204 according to the folding operation or the unfolding operation. For example, the distance between the first rotation boss 345a and the slider 247a as measured along the Y-axis direction may be different when the rotation bosses 345a and 345b are aligned along the Y-axis direction from when the rotation bosses 345a and 345b are aligned in an inclined direction with respect to the Y axis. In the following embodiment, the position of the slider 247a may be referred to as a "displacement DY1" based on the position of the slider 247a when the rotation bosses 345a and 345b are aligned along the Y-axis direction. In an embodiment, as the displacement DY1 increases, the distance between the rotation axis R (e.g., the first rotation boss 345a) and the slider 247a (e.g., a distance measured along the Y-axis direction) may be set to be small. In an embodiment, the link 247b may be in a locked state that makes the link 247b immovable in the Y-axis direction. In this case, the slider 247a may be coupled with the link 247b such that the slider 247a is capable of linearly reciprocating and/or slidably moving along the Y-axis direction. In an embodiment, the link 247b may be locked with the slider 247a in the Y-axis direction, and the displacement DY1 of the slider 247a may be allowed by slidably coupling the link 247b and the connection pin 247c to each other.

According to various embodiments, as illustrated in FIG. 15, the displacement DY1 may be inversely proportional to the radiuses of curvature of rotation trajectories T1 and T2 of the second rotation bosses 345b and/or the distance between the second rotation bosses 345b. In an embodiment, distances for which the second rotation bosses 345b move along the rotation trajectories T1 and T2 may be proportional to an angle at which the housings 210 and 220 rotate. In an embodiment, when the second rotation bosses 345b move for the same distance along the rotation trajectories T1 and T2, as the radiuses of curvature of the rotation trajectories T1 and T2 are greater, the displacement DY1 may be smaller. In a detent structure to be described later, an elastic forces accumulated in an elastic member 447 may be proportional to the displacement DY1.

According to various embodiments, when the radiuses of curvature of the rotation trajectories T1 and T2 are reduced, it may be easy to miniaturize the rotation plate 245, the hinge module 204, and/or the electronic device 200. In an embodiment, when the radiuses of curvature of the rotation trajectories T1 and T2 are reduced, a force required to rotate the rotation plate 245 may increase. The force required to rotate the rotation plate 245 may refer, for example, to a force applied by a user in the folding or unfolding operation of the electronic device 200. For example, the radiuses of curvature of the rotation trajectories T1 and T2 formed by the second rotation bosses 345b may be set appropriately in consideration of an elastic force suitable for miniaturization of the electronic device 200 and implementation of the detent structure, and/or the convenience of opening and closing operations.

According to various embodiments, the hinge module 204 and/or the electronic device 200 including the same may further include the elastic member 447. The elastic member 447 may be, for example, a compression coil spring, which is disposed to surround the slider 247a, and have one end supported by one end of the slider 247a and the other end supported by the link 247b. An elastic force may be applied in a direction in which both ends of the elastic member 447 become farther from each other. In an embodiment, the elastic member 447 may be used as a detent structure in the folding operation or the unfolding operation in combination with the Y-axis direction displacement of the slider 247a. This will be further described with reference to FIG. 16.

Figure 16:
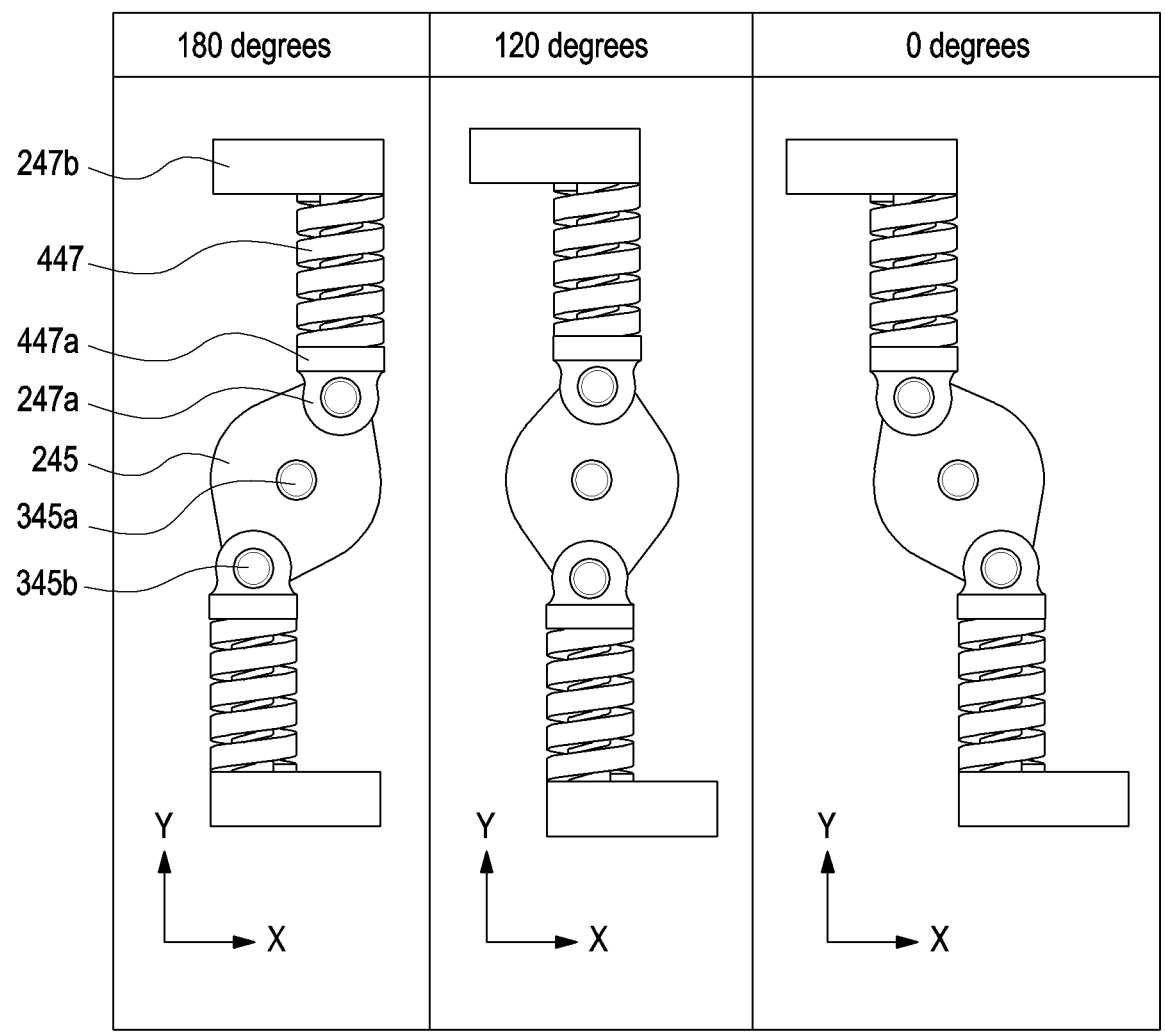
FIG. 16 is a diagram illustrating an example of a hinge module, which uses displacement of a slider, in an electronic device according to various embodiments.

FIG. 16 is a diagram illustrating an example using the displacement of the slider 247a in a hinge module (e.g., the hinge module 204 in FIGS. 4 and 5) of an electronic device (e.g., the electronic devices 100 and 200 in FIGS. 1, 2, 3, and 4) according to various embodiments.

Referring further to FIG. 16 together with FIG. 13, the slider 247a may further include a flange portion 447a at one end thereof, and in a state where one end of the elastic member 447 is supported by the flange portion 447a and the other end thereof is supported by the link 247b, the flange may be disposed to surround the slider 247a. Accordingly, the elastic member 447 may provide an elastic force in a direction in which the flange portion 447a moves away from the link 247b. According to an embodiment, at a 180-degree position, the slider 247a may be locked with the hinge bracket 243, and thus the hinge plates 241a and 241b and/or housings (e.g., the first housing 210 and the second housing 220 in FIG. 4) may be restricted from being unfolded beyond 180 degrees. For example, in FIG. 16, although at the 180-degree position, the elastic force provided by the elastic member 447 has a tendency to rotate the rotation plate 225 clockwise, the slider 247a may be interfered by the hinge bracket 243, and thus the rotation plate 225 may not rotate clockwise any longer. Accordingly, the elastic member 447 may stably maintain the electronic device 200 to be unfolded at 180 degrees. In various embodiments, at a 0-degree position, the housings 210 and 220 of the electronic device 200 may already be in contact. Herein, the elastic member 447 may have a tendency to rotate the rotation plate 245 in a counterclockwise direction, while bringing the slider 247a into close contact with the hinge bracket 243. For example, the elastic member 447 may stably maintain the housings 210 and 220 of the electronic device 200 facing and contacting each other. In various embodiments, at the 0-degree position or the 180-degree position, the housings 210 and 220 of the electronic device 200 may contact first, so that the slider 247a may not directly contact the hinge bracket 243. In an embodiment, a feeling of operation, for example, a clicking feeling may be generated at a position at which accumulation of the elastic force of the elastic member 447 is maximized (e.g., the 120-degree position in FIG. 10) or at the 0-degree position and/or the 180-degree position during the unfolding operation or the folding operation. For example, the user may recognize a time when the opening or closing operation of the electronic device 200 is completed from the clicking feeling generated by the elastic force of the elastic member 447.

According to various embodiments, with the hinge plate(s) 241a or 241b and/or the housings 210 and 220 unfolded at approximately 120 degrees, the rotation bosses 345a and 345b may be substantially aligned in the Y-axis direction, and the elastic member 447 may be in a maximally compressed state. In an embodiment, between the 180-degree position and the 120-degree position, the elastic force of the elastic member 447 may rotate the rotating plate 245 clockwise. When the rotation plate 245 rotates to reach the 180-degree position, the slider 247a may come into contact with the hinge bracket 243 to stop the rotation of the rotation plate 245 and/or unfolding of the housings 210 and 220. In an embodiment, between the 0-degree position and the 120-degree position, the elastic force of the elastic member 447 may rotate the rotation plate 245 counterclockwise, and when the rotation plate 245 rotates to reach the 0-degree position, the slider 247a may come into contact with the hinge bracket 243 to stop the rotation of the rotation plate 245 and/or the folding operation of the housings 210 and 220. As described before, at the 0-degree position or the 180-degree position, the housings 210 and 220 of the electronic device 200 may first contact, so that the slider 247a may not directly contact the hinge bracket 243. It should be noted that the rotation directions of the rotation plate 245 have been described based on the states illustrated in FIG. 16, not limiting various embodiments of the disclosure.

As described above, according to various example embodiments of the disclosure, an electronic device (e.g., the electronic devices 100 and 200 in FIGS. 1, 2, 3, and 4) may include: a first housing and a second housing (e.g., the first housing structure 110 and the second housing structure 120 in FIGS. 1, 2 and 3 and/or the first housing 210 and the second housing 220 in FIG. 4) configured to rotate with respect to each other between a first position (e.g., the state illustrated in FIG. 2) at which the first housing and the second housing are disposed to face each other and a second position (e.g., the state illustrated in FIG. 1) at which the first housing and the second housing are unfolded at a predetermined angle with respect to each other, and a hinge module (e.g., the hinge module 204 in FIGS. 4 and 5) including a hinge disposed between the first housing and the second housing and configured to couple the first housing and the second housing to be rotatable with respect to each other. The hinge module may include a first hinge plate (e.g., the first hinge plates 164b and 241a in FIGS. 3, 4 and 5) coupled with the first housing and disposed to be rotatable around a first rotation axis (e.g., the first rotation axis P1 in FIGS. 6, 7 and 8), a second hinge plate (the second hinge plates 164c and 241b in FIGS. 3, 4 and 5) coupled with the second housing and disposed to be rotatable around a second rotation axis (e.g., the second rotation axis P2 in FIGS. 6, 7 and 8) parallel to the first rotation axis, a rotation plate (e.g., the rotation plate 245 in FIGS. 4, 5, 6, 7, 8, and 9) disposed to be rotatable around a rotation axis (e.g., the rotation axis R in FIG. 5 or FIG. 8) perpendicular to the first rotation axis or the second rotation axis, a first interlocking assembly (e.g., one of the interlocking assemblies 247 in FIG. 5) including at least one of a slider, a link or a connection pin configured to couple the first hinge plate and the rotation plate to each other, and a second interlocking assembly (e.g., the other of the interlocking assemblies 247 in FIG. 5) including at least one of a slider, a link or an connection pin configured to couple the second hinge plate and the rotation plate to each other. As the first housing and the second housing rotate, the first hinge plate and the second hinge plate may be configured to be interlocked with each other by the rotation plate, the first interlocking assembly, and the second interlocking assembly to rotate between the first position and the second position.

According to various example embodiments, the electronic device may further include: a flexible display including a first region (e.g., the first region 131a in FIG. 1) disposed in the first housing, a second region (e.g., the second region 131b in FIG. 1) disposed in the second housing, and a folding region (e.g., the folding region 131c in FIG. 1) disposed to correspond with a region in which the hinge module is disposed and connecting the first region and the second region to each other. The first region and the second region may be disposed to face each other at the first position, and as the first housing and the second housing rotate, the folding region may be configured to be deformed between a curved shape and a flat shape.

According to various example embodiments, the hinge module may further include a hinge bracket (e.g., the hinge bracket 243 in FIGS. 4, 5, 6, 7, and 8), and the first hinge plate and the second hinge plate may be coupled to be rotatable with the hinge bracket.

According to various example embodiments, the electronic device may further include a hinge cover (e.g., the hinge covers 165 and 265 in FIGS. 2, 3 and 4) at least partially disposed between the first housing and the second housing, and the hinge bracket may be mounted inside the hinge cover.

According to various example embodiments, the hinge module may further include at least one first hinge arm (e.g., one or more of the hinge arms 341a in FIG. 5) formed on the first hinge plate and at least partially accommodated in the hinge bracket, a first link arm (e.g., one or more of the link arms 341c in FIG. 5) formed on the first hinge plate and disposed adjacent to the first hinge arm, at least one second hinge arm (e.g., other one or more of the hinge arms 341a in FIG. 5) formed on the second hinge plate and at least partially accommodated in the hinge bracket, and a second link arm (e.g., other one or more of the link arms 341c in FIG. 5) formed on the second hinge plate and disposed adjacent to the second hinge arm. The rotation plate may be coupled to be rotatable with the hinge bracket between the first hinge arm and the second hinge arm or between the first link arm and the second link arm.

According to various example embodiments, the first interlocking assembly or the second interlocking assembly may include: a slider (e.g., the slider 247a in FIGS. 4, 5, 6, 7, 8, and 9) coupled with the rotation plate and configured to rotate around a third rotation axis along with rotation of the rotation plate, a link (e.g., the link 247b in FIGS. 4, 5, 6, 7, 8, and 9) configured to rotate around the slider, while surrounding at least a part of the slider, and a connection pin (e.g., the connection pin 247c in FIGS. 4, 5, 6, 7, 8, and 9) disposed in parallel to the slider and locked with any one of the first link arm and the second link arm through the link.

According to various example embodiments, the hinge module may further include: a rotation guide groove (e.g., the rotation guide grooves 341b in FIG. 5) extending along an arc trajectory around one of the first rotation axis and the second rotation axis and formed in at least one of the first hinge arm or the second hinge arm, and a plurality of rotation rails (the rotation rails 343b in FIG. 5) extending along the arc trajectory around one of the first rotation axis and the second rotation axis and formed in the hinge bracket. The rotation rails may be configured to guide rotation of the first hinge plate or the second hinge plate and accommodated in the rotation guide groove, movably along the arc trajectory.

According to various example embodiments of the disclosure, a hinge module (e.g., the hinge module 204 in FIGS. 4 and 5) and/or an electronic device including the hinge module (e.g., the electronic devices 100 and 200 in FIGS. 1, 2, 3, and 4) may include: a first hinge plate (e.g., the first hinge plates 164b and 241a in FIGS. 3, 4 and 5) disposed to be rotatable around a first rotation axis (e.g., the first rotation axis P1 in FIGS. 6, 7 and 8), a second hinge plate (e.g., the second hinge plates 164c and 241b in FIGS. 3, 4 and 5) disposed to be rotatable around a second rotation axis (e.g., the second rotation axis P2 in FIGS. 6, 7 and 8) parallel to the first rotation axis, a rotation plate (e.g., the rotation plate 245 in FIGS. 4, 5, 6, 7, 8, and 9) disposed to be rotatable around a rotation axis (e.g., the rotation axis R in FIGS. 5, 6, 7 and 8) perpendicular to the first rotation axis or the second rotation axis, a first interlocking assembly (e.g., one of the interlocking assemblies 247 in FIG. 5) including at least one of a slider, a link or a connection pin configured to couple the first hinge plate and the rotation plate to each other, and a second interlocking assembly (e.g., the other of the interlocking assemblies 247 in FIG. 5) including at least one of a slider, a link or a connection pin configured to couple the second hinge plate and the rotation plate to each other. The first hinge plate and the second hinge plate may be configured to be interlocked with each other by the rotation plate, the first interlocking assembly, and the second interlocking assembly to rotate between a first position (e.g., the position illustrated in FIG. 2 or the 0-degree position in FIG. 10) at which the first hinge plate and the second hinge plate face each other and a second position (e.g., the position illustrated in FIG. 1 or the 180-degree position in FIG. 10) at which the first hinge plate and the second hinge plate are unfolded at a predetermined angle with respect to each other.

According to various example embodiments, the first hinge plate and the second hinge plate may be disposed in parallel to the rotation axis at the first position and in parallel to the rotation plate at the second position.

According to various example embodiments, in the hinge module and/or the electronic device including the hinge module, wherein as one of the first hinge plate and the second hinge plate rotates, one of the first interlocking assembly and the second interlocking assembly may be configured to rotate the rotation plate, and as the rotation plate rotates, the other of the first interlocking assembly and the second interlocking assembly may be configured to rotate the other of the first hinge plate and the second hinge plate.

According to various example embodiments, the first interlocking assembly or the second interlocking assembly may include a slider (e.g., the slider 247a in FIGS. 4, 5, 6, 7, 8, and 9) coupled with the rotation plate and configured to rotate around a third rotation axis (e.g., the third rotation axis P3 in FIG. 9) along with rotation of the rotation plate, a link (e.g., the link 247b in FIGS. 4, 5, 6, 7, 8, and 9) configured to rotate around the slider, while surrounding at least a part of the slider, and a connection pin (e.g., the connection pin 247c in FIGS. 4, 5, 6, 7, 8, and 9) disposed in parallel to the slider and locked with one of the first hinge plate and the second hinge plate through the link.

According to various example embodiments, as the rotation plate rotates, the slider may be configured to rotate around the third rotation axis, while being maintained parallel to the first rotation axis or the second rotation axis.

According to various example embodiments, the rotation plate comprises a pair of rotation bosses (e.g., the second rotation bosses 345b in FIG. 5) protruding on one surface, apart from each other by a predetermined distance, and the slider may be rotatably coupled with one of the rotation bosses.

According to various example embodiments, as the rotation plate rotates, the slider may be configured to linearly reciprocate in a length direction, while being surrounded by the link.

According to various example embodiments, the hinge module and/or the electronic device including the hinge module may further include an elastic member (e.g., the elastic member 447 in FIG. 13 and/or FIG. 16) comprising a compression coil or spring disposed to surround an outer circumferential surface of the slider, while one end of the elastic member is supported by the slider and the other end thereof is supported by the link. As the slider linearly reciprocates, the elastic member may be configured to be compressed or extended.

According to various example embodiments, the hinge module and/or the electronic device including the hinge module may further include a hinge bracket (e.g., the hinge bracket 243 in FIGS. 4, 5, 6, 7, and 8), and the first hinge plate and the second hinge plate may be rotatably coupled with the hinge bracket.

According to various example embodiments, the hinge module and/or the electronic device including the hinge module may further include: at least one first hinge arm (e.g., one or more of the hinge arms 341a in FIG. 5) formed on the first hinge plate and at least partially accommodated in the hinge bracket, a first link arm (e.g., one or more of the link arms 341c in FIG. 5) formed on the first hinge plate and disposed adjacent to the first hinge arm, at least one second hinge arm (e.g., other one or more of the hinge arms 341a in FIG. 5) formed on the second hinge plate and at least partially accommodated in the hinge bracket, and a second link arm (e.g., other one or more of the link arms 341c in FIG. 5) formed on the second hinge plate and disposed adjacent to the second hinge arm. The rotation plate may be rotatably coupled with the hinge bracket between the first hinge arm and the second hinge arm or between the first link arm and the second link arm.

According to various example embodiments, the first interlocking assembly or the second interlocking assembly may include a slider coupled with the rotation plate and configured to rotate around a third rotation axis along with rotation of the rotation plate, a link configured to rotate around the slider, while surrounding at least a part of the slider, and a connection pin disposed in parallel to the slider and locked with any one of the first link arm and the second link arm through the link.

According to various example embodiments, the hinge module and/or the electronic device including the hinge module may further include: a rotation guide groove (e.g., the rotation guide grooves 341b in FIG. 5) extending along an arc trajectory around one of the first rotation axis and the second rotation axis and formed in at least one of the first hinge arm or the second hinge arm, and a plurality of rotation rails (e.g., the rotation rails 343b in FIG. 5) extending along the arc trajectory around one of the first rotation axis and the second rotation axis and formed in the hinge bracket. The rotation rails may be configured to guide rotation of the first hinge plate or the second hinge plate by being accommodated in the rotation guide groove, movably along the arc trajectory.

According to various example embodiments, the rotation plate may include a rotation boss (e.g., the first rotation boss 345a in FIG. 5) protruding on one surface, and the rotation boss may be rotatably coupled with a part of the hinge bracket (e.g., the rotation hole 343c in FIG. 5) through the part of the hinge bracket.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
a first housing and a second housing configured to rotate with respect to each other between a first position at which the first housing and the second housing are disposed to face each other and a second position at which the first housing and the second housing are unfolded from the first position at a specified angle with respect to each other; and
a hinge module including a hinge disposed between the first housing and the second housing and configured to couple the first housing and the second housing to be rotatable with respect to each other, wherein the hinge module comprises:
a first hinge plate coupled with the first housing and disposed to be rotatable around a first rotation axis;
a second hinge plate coupled with the second housing and disposed to be rotatable around a second rotation axis parallel to the first rotation axis;
a rotation plate disposed to be rotatable around a rotation axis perpendicular to the first rotation axis or the second rotation axis;
a first interlocking assembly including at least one of a slider, a link or a connection pin configured to couple the first hinge plate and the rotation plate to each other; and
a second interlocking assembly including at least one of a slider, a link or a connection pin configured to couple the second hinge plate and the rotation plate to each other, and
wherein, the first hinge plate and the second hinge plate are configured to be interlocked with each other by the rotation plate, the first interlocking assembly, and the second interlocking assembly to rotate between the first position and the second position as the first housing and the second housing rotate.

2. The electronic device of claim 1, further comprising: a flexible display including a first region disposed in the first housing, a second region disposed in the second housing, and a folding region corresponding with a region in which the hinge module is disposed and configured to connect the first region and the second region to each other,
wherein the first region and the second region are disposed to face each other at the first position, and
wherein, the folding region is configured to be deformed between a curved shape and a flat shape as the first housing and the second housing rotate.

3. The electronic device of claim 1, wherein the hinge module further comprises a hinge bracket, and
wherein the first hinge plate and the second hinge plate are coupled to be rotatable with the hinge bracket.

4. The electronic device of claim 3, further comprising a hinge cover at least partially disposed between the first housing and the second housing,
wherein the hinge bracket is mounted inside the hinge cover.

5. The electronic device of claim 3, wherein the hinge module further comprises:
at least one first hinge arm formed on the first hinge plate and at least partially accommodated in the hinge bracket;
a first link arm formed on the first hinge plate and disposed adjacent to the first hinge arm;
at least one second hinge arm formed on the second hinge plate and at least partially accommodated in the hinge bracket; and
a second link arm formed on the second hinge plate and disposed adjacent to the second hinge arm, and
wherein the rotation plate is coupled to be rotatable with the hinge bracket between the first hinge arm and the second hinge arm or between the first link arm and the second link arm.

6. The electronic device of claim 5, wherein the first interlocking assembly or the second interlocking assembly comprises:
a slider coupled with the rotation plate and configured to rotate around a third rotation axis along with rotation of the rotation plate;
a link configured to rotate around the slider, while surrounding at least a part of the slider; and a connection pin disposed in parallel to the slider and locked with any one of the first link arm and the second link arm through the link.

7. The electronic device of claim 5, wherein the hinge module further comprises:
   a rotation guide groove extending along an arc trajectory around one of the first rotation axis and the second rotation axis and formed in at least one of the first hinge arm or the second hinge arm; and
   a plurality of rotation rails extending along the arc trajectory around one of the first rotation axis and the second rotation axis and formed in the hinge bracket, and
   wherein the rotation rails are configured to guide rotation of the first hinge plate or the second hinge plate in the rotation guide groove along the arc trajectory.

8. A hinge module comprising:
   a first hinge plate disposed to be rotatable around a first rotation axis;
   a second hinge plate disposed to be rotatable around a second rotation axis parallel to the first rotation axis;
   a rotation plate disposed to be rotatable around a rotation axis perpendicular to the first rotation axis or the second rotation axis;
   a first interlocking assembly including at least one of a slider, a link or a connection pin configured to couple the first hinge plate and the rotation plate to each other; and
   a second interlocking assembly including at least one of a slider, a link or a connection pin configured to couple the second hinge plate and the rotation plate to each other,
   wherein the first hinge plate and the second hinge plate are configured to be interlocked with each other by the rotation plate, the first interlocking assembly, and the second interlocking assembly to rotate between a first position at which the first hinge plate and the second hinge plate face each other and a second position at which the first hinge plate and the second hinge plate are unfolded from the first position at a specified angle with respect to each other.

9. The hinge module of claim 8, wherein the first hinge plate and the second hinge plate are disposed in parallel to the rotation axis at the first position and in parallel to the rotation plate at the second position.

10. The hinge module of claim 8, wherein, one of the first interlocking assembly and the second interlocking assembly is configured to rotate the rotation plate, as one of the first hinge plate and the second hinge plate rotates and
    wherein, the other of the first interlocking assembly and the second interlocking assembly is configured to rotate the other of the first hinge plate and the second hinge plate as the rotation plate rotates.

11. The hinge module of claim 8, wherein the first interlocking assembly or the second interlocking assembly comprises:
    a slider coupled with the rotation plate and configured to rotate around a third rotation axis along with rotation of the rotation plate;
    a link configured to rotate around the slider, while surrounding at least a part of the slider; and
    a connection pin disposed in parallel to the slider and locked with any one of the first hinge plate and the second hinge plate through the link.

12. The hinge module of claim 11, wherein, the slider is configured to rotate around the third rotation axis, while being maintained parallel to the first rotation axis or the second rotation axis as the rotation plate rotates.

13. The hinge module of claim 11, wherein the rotation plate comprises a pair of rotation bosses protruding on one surface, and disposed apart from each other by a specified distance, and
    wherein the slider is rotatably coupled with one of the rotation bosses.

14. The hinge module of claim 11, wherein, the slider is configured to linearly reciprocate in a length direction, while being surrounded by the link as the rotation plate rotates.

15. The hinge module of claim 14, further comprising an elastic member comprising an elastic material configured to provide compressive force surrounding an outer circumferential surface of the slider, while one end of the elastic member is supported by the slider and the other end thereof is supported by the link,
    wherein, the elastic member is configured to be compressed or extended as the slider linearly reciprocates.

* * * * *